United States Patent
Wang

(10) Patent No.: US 9,516,308 B2
(45) Date of Patent: Dec. 6, 2016

(54) PARAMETER SET UPDATES IN VIDEO CODING

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 13/870,833

(22) Filed: Apr. 25, 2013

(65) Prior Publication Data

US 2013/0294499 A1 Nov. 7, 2013

Related U.S. Application Data

(60) Provisional application No. 61/639,823, filed on Apr. 27, 2012.

(51) Int. Cl.
| | |
|---|---|
| *H04N 19/102* | (2014.01) |
| *H04N 19/196* | (2014.01) |
| *H04N 21/236* | (2011.01) |
| *H04N 21/845* | (2011.01) |
| *H04N 19/70* | (2014.01) |

(Continued)

(52) U.S. Cl.
CPC ...... *H04N 19/00369* (2013.01); *H04N 19/196* (2014.11); *H04N 19/40* (2014.11); *H04N 19/70* (2014.11); *H04N 21/23614* (2013.01); *H04N 21/8451* (2013.01); *H04N 19/61* (2014.11); *H04N 19/96* (2014.11)

(58) Field of Classification Search
CPC .................................................... H04N 19/70
See application file for complete search history.

(56) References Cited

U.S. PATENT DOCUMENTS

| | | |
|---|---|---|
| 8,233,547 B2 | 7/2012 | Winger |
| 2004/0066854 A1 | 4/2004 | Hannuksela |

(Continued)

FOREIGN PATENT DOCUMENTS

| | | |
|---|---|---|
| WO | 2012097749 A1 | 7/2012 |

OTHER PUBLICATIONS

Bross, et al., "High Efficiency Video Coding (HEVC) text specification draft 10 (for FDIS & Consent)", MPEG Meeting; Jan. 21, 2013-Jan. 25, 2013; Geneva; (Motion Picture Expert Group or ISO/IEC JTC1/SC29/WG11), No. m28292, XP030056838, 332 pp. [uploaded in parts].

(Continued)

*Primary Examiner* — Christopher Findley
(74) *Attorney, Agent, or Firm* — Shumaker & Sieffert, P.A.

(57) ABSTRACT

Techniques of this disclosure provide an indication of whether a parameter set update can occur in a portion of a bitstream. The indication may enable a video decoder to determine whether an update of a stored parameter set can occur without performing a content comparison between the stored parameter set and a new parameter set of the same type with the same identification value. A parameter set update includes storing a current parameter set with a given identification value to replace a previous parameter set of the same type and having the same identification value. When a parameter set update cannot occur, the video decoder may store and activate a single parameter set of a given type for the entire portion of the bitstream. When a parameter set update can occur, the video decoder may automatically update a stored parameter set, or may determine whether to update the stored parameter.

35 Claims, 8 Drawing Sheets

(51) Int. Cl.
*H04N 19/40* (2014.01)
*H04N 19/61* (2014.01)
*H04N 19/96* (2014.01)

(56) References Cited

U.S. PATENT DOCUMENTS

| | | | |
|---|---|---|---|
| 2005/0254526 | A1 | 11/2005 | Wang et al. |
| 2010/0246662 | A1 | 9/2010 | Koto et al. |
| 2011/0216836 | A1 | 9/2011 | Luo et al. |
| 2012/0023249 | A1* | 1/2012 | Chen .................... H04N 21/235 709/231 |
| 2012/0027088 | A1 | 2/2012 | Chien et al. |
| 2012/0189058 | A1 | 7/2012 | Chen et al. |
| 2012/0230397 | A1 | 9/2012 | Ouedraogo et al. |
| 2012/0230430 | A1* | 9/2012 | Wenger .................. H04N 19/70 375/240.25 |
| 2013/0022104 | A1 | 1/2013 | Chen et al. |
| 2013/0272618 | A1 | 10/2013 | Deshpande et al. |
| 2013/0294500 | A1 | 11/2013 | Wang |
| 2014/0146885 | A1 | 5/2014 | Park et al. |
| 2015/0063463 | A1 | 3/2015 | Choi et al. |

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross, et al., "WD6: High Efficiency Video Coding (HEVC) text specification draft 6 (version JCTVC-H1003_dA)", Joint Collaborative Team on Video Coding (JCT-VC) of ITU-T SG16 WP3 and ISO/IEC JTC1/SC29/WG11 7th Meeting: Geneva, CH, Nov. 21-30, 2011, 239 pp., XP55054460 [uploaded in parts].

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Cho, et al., "On random access at CRA access units", MPEG Meeting; Jan. 21, 2013-Jan. 25, 2813; Geneva; (Motion Picture Expert Group or ISO/IEC JTC1/SC29/WG11), No. m27486, XP030056056, 4 pp.

Deshpande, et al., "AHG11: Signaling of CRA Pictures", JCT-VC Meeting; MPEG Meeting; Apr. 27, 2012-May 7, 2012; Geneva; (Joint Collaborative Team on Video Coding of ISO/IEC JTC1/SC29/WG11 and ITU-T SG.16); URL: Http://WFTP3.ITU.INT/AV-ARCH/JCTVC-SITE/., No. JCTVC-I0278, XP030112041, 4 pp.

Ericsson: "Restrictions on AVC parameter sets updates", 3GPP Draft; S4-040462, 3rd Generation Partnership Project (3GPP), Mobile Competence Centre ; 650, Route Des Lucioles ; F-06921 Sophia-Antipolis Cedex , France, vol. SA WG4, no. Prague, Czech Republic; Aug. 12, 2004, (Aug. 12, 2004), XP050286973, 1 pp.

International Preliminary Report on Patentability—PCT/US2013/038444, The International Bureau of WIPO—Geneva, Switzerland, Jul. 18, 2014, 13 pp.

International Search Report and Written Opinion—PCT/US2013/038444—ISA/EPO—Jun. 28, 2013, 14 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Kanumuri, et al.,"Category-Prefixed Data Batching for Tiles and Wavefronts", Microsoft Corporation, Joint Collaborative Team on Video Coding (JCT-VC) of ITU-T SG 16 WP 3 and ISO/IEC JTC 1/SC 29/WG 11, 9th Meeting: Geneva, CH, JCTVC-I0427, Apr. 27-May 7, 2012, 6 pp.

Lim, et al., "High-Level Syntax: Proposed Fix on Signaling of TMVP Disabling Flag", Panasonic Corporation, Joint Collaborative Team on Video Coding (JCT-VC) of ITU-T SG 16 WP 3 and ISO/IEC JTC 1/SC 29/WG 11, Geneva, CH, JCTVC-I0420, Apr. 27-May 7, 2012, 6 pp.

Minezawa, et al., "On APS reference restriction for random access", JCT-VC Meeting; MPEG Meeting; Apr. 27, 2012-May 7, 2012; Geneva; (Joint Collaborative Team on Video Coding of ISO/IEC JTC1/SC29/WG11 and ITU-T SG.16); URL:http://wftp3.itu.int/av-arch/jctvc-site/, No. JCTVC-I0067, XP030111830, 4 pp.

Nokia 1: "AVC parameter set update in PSS", 3GPP Draft; S4-040235, 3rd Generation Partnership Project (3GPP), Mobile Competence Centre ; 650, Route Des Lucioles ; F-06921 Sophia-Antipolis Cedex, France, vol. SA WG4, no. Montreal, Canada; May 13, 2004, May 13, 2004 (May 13, 2004), XP050286758, [retrieved on May 13, 2004] Section 3 Proposal, 4 pp.

Schierl et al., "RTP Payload Format for High Efficiency Video Coding," Feb. 27, 2012, 43 pp.

Schwarz et al., "Overview of the Scalable Video Coding Extension of the H.264/AVC Standard", IEEE Transactions on Circuits and Systems for Video Technology, Sep. 1, 2007, vol. 17, No. 9, IEEE Service Center, XP011193019, ISSN: 1051-8215, DOI: 10.1109/TCSVT.2007.905532, 18 pp.

Suehring, et al.,"Long-Term Picture Signalling for Error-free Environments", Fraunhofer HHI, Joint Collaborative Team on Video Coding (JCT-VC) of ITU-T SG16 WP3 and ISO/IEC JTC1/SC29/WG11, 9th Meeting: Geneva, CH, JCTVC-I0112, Apr. 27-May 7, 2012, 7 pp.

"Text of ISO/IEC 14496-15/FDIS", MPEG Meeting; Jul. 21, 2003-Jul. 25, 2003; Trondheim; (Motion Pictureexpert Group or ISO/IEC JTC1/SC29/WG11), Aug. 11, 2003, No. N5780, XP030012885, ISSN: 0000-0357, 32 pp.

"Study Text of ISO/IEC 14496-15/FCD", 62. MPEG Meeting; Oct. 21, 2002-Oct. 25, 2002; Shanghai; (Motion Pictureexpert Group or ISO/IEC JTC1/SC29/WG11), No. N5303, Nov. 14, 2002 (Nov. 14, 2002), XP030012588, ISSN: 0000-0362, 32 pp.

Walker, et al., "Support for Storage of AVC Content in the MP4 File Format", 61. MPEG Meeting; Jul. 22, 2002-Jul. 26, 2002; Klagenfurt; (Motion Pictureexpert Group or ISO/IEC JTC1/SC29/WG11), No. M8708, Jul. 25, 2002 (Jul. 25, 2002), XP030037657, ISSN: 0000-0272, 38 pp.

Wang, "AHG9: On CRA and BLA pictures", JCT-VC Meeting; MPEG Meeting; Oct. 18, 2812-Oct. 19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/, No. JCTVC-K0122, XP030113004, 3 pp.

Wang, "AVS-M: From Standards to Applications", Journal of Computer Science and Technology, Kluwer Academic Publishers, BO, vol. 21, No. 3, May 1, 2006 (May 1, 2006), XP019411312, ISSN: 1860-4749, 13 pp.

Wang, et al., "AHG9: Indication of parameter sets properties in HEVC", MPEG Meeting; Jan. 21, 2013-Jan. 25, 2013; Geneva; (Motion Picture Expert Group or ISO/IEC JTC1/SC29/WG11), No. m27375, Jan. 15, 2013, XP030055945, 4 pp.

Wang, et al., "AHG9: On RAP pictures", JCT-VC Meeting; MPEG Meeting; Jul. 11, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/, No. JCTVC-J0107, XP030112469, 7 pp.

Wang, et al., "AHG9: Signalling of bitstream and elementary stream properties", JCT-VC Meeting; MPEG Meeting; Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/, No. JCTVC-K0127, XP030113009, 9 pp.

Wang, et al., "AHG9: Splicing-friendly coding of some parameters", MPEG Meeting; Jul. 16, 2012-Jul. 20, 2012; Stockholm;

(56) References Cited

OTHER PUBLICATIONS (Motion Picture Expert Group or ISO/IEC JTC1/SC29/WG11), No. m25430, XP030053764, 9 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wang "AHG9: High-level syntax clean-ups", MPEG Meeting; Oct. 15, 2012-Oct. 19, 2012; Shanghai; (Motion Picture Expert Group or ISO/IEC JTC1/SC29/WG11), No. m26412, XP030054745, 9 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2013/038444, Apr. 24, 2014, 10 pp.

Taiwan Search Report—TW102115166—TIPO—Jul. 29, 2015 (1 page).

Tan T K et al., "Clean Decoding Refresh Definition and Decoding Process", 6. JCT-VC Meeting; 97. MPEG Meeting; Jul. 14, 2011-Jul. 22, 2011; Torino; (Joint Colloborative Team on Video Coding of ISO/IEC JTC1/SC29/WG11 and ITU-T SG.16); URL : Http://WFTP3.ITU.INT/AV-ARCH/JCTVC-SITE/,, No. JCTVC-F381, Jul. 1, 2011 (Jul. 1, 2011), XP030009404 (3 pages).

\* cited by examiner

PARAMETER SET UPDATES IN VIDEO CODING

RELATED APPLICATIONS

This application claims the benefit of U.S. Provisional Application No. 61/639,823, filed Apr. 27, 2012, which is hereby incorporated by reference in its entirety.

TECHNICAL FIELD

This disclosure generally relates to processing video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, High-Efficiency Video Coding (HEVC) is a video coding standard being developed by the Joint Collaboration Team on Video Coding (JCT-VC) of ITU-T Video Coding Experts Group (VCEG) and ISO/IEC Motion Picture Experts Group (MPEG). Video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based predictive video coding, a video slice (e.g., a video frame or a portion of a video frame) may be partitioned into video blocks, which may also be referred to as macroblocks, treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. Pixels may also be referred to as picture elements, pels, or samples. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques to provide an indication of whether a parameter set update can occur in a portion of a bitstream (e.g. a coded video sequence or a group of pictures (GOP)). The indication may enable a video decoder to determine whether an update of a stored parameter set can occur without performing a content comparison between the stored parameter set and a new parameter set of the same type with the same identification value. A parameter set update includes storing a current parameter set with a given identification value to replace a previous parameter set of the same type and having the same identification value. When a parameter set update cannot occur, the video decoder may store and activate a single parameter set of a given type for the entire portion of the bitstream. When a parameter set update can occur, the video decoder may automatically activate a new parameter set and deactivate a stored parameter set of a given type, or may determine whether to update the stored parameter, e.g., by performing a content comparison.

The indication may comprise a bitstream-level indication, such as a syntax element included in the portion of the bitstream. For example, the indication may comprise a flag included in supplemental enhancement information (SEI) network abstraction layer (NAL) units in the bitstream. As another example, the indication may comprise a flag included in sequence parameter set (SPS) NAL units in the bitstream. In one example, the techniques include decoding a flag that indicates whether any parameter set can be updated in a portion of a bitstream. In this case, the same flag may be used for all types of parameter sets, including video parameter sets (VPSs), sequence parameter sets (SPSs), picture parameter sets (PPSs), and/or adaptive parameter sets (APSs). In particular, a single flag may indicate whether any of the parameter sets in the bitstream can be updated. In another example, the techniques include decoding several different flags, each of which indicates whether a parameter set of a particular type can be updated in the portion of the bitstream.

In one example, the disclosure is directed toward a method of decoding video data comprising decoding an indicator that indicates whether a parameter set update can occur in a portion of a bitstream, wherein a parameter set update includes storing a current parameter set to replace a previous parameter set of a same type and having a same identification value. Based on the indicator indicating that the parameter set update cannot occur in the portion of the bitstream, the method further comprises activating a first parameter set of a particular type with a particular identification value for the entire portion of the bitstream.

In another example, the disclosure is directed toward a method of encoding video data comprising encoding a first parameter set of a particular type with a particular identification value for a portion of a bitstream, and encoding an indicator that indicates whether a parameter set update can occur in the portion of the bitstream, wherein a parameter set update includes storing a current parameter set to replace a previous parameter set of a same type and having a same identification value, and wherein, based on the indicator indicating that the parameter set update cannot occur in the portion of the bitstream, the first parameter set is activated for the entire portion of the bitstream.

In a further example, the disclosure is directed toward a video coding device for coding video data, the device comprising a memory configured to store video data, and one or more processors configured to code an indicator that indicates whether a parameter set update can occur in a portion of a bitstream, wherein a parameter set update includes storing a current parameter set to replace a previous parameter set of a same type and having a same identification value. Based on the indicator indicating that the parameter set update cannot occur in the portion of the bitstream, the processors of the devices are further configured to activate a first parameter set of a particular type with a particular identification value for the entire portion of the bitstream.

In another example, the disclosure is directed toward a video coding device for coding video data, the device comprising means for coding an indicator that indicates whether a parameter set update can occur in a portion of a bitstream, wherein a parameter set update includes storing a current parameter set to replace a previous parameter set of a same type and having a same identification value, and, based on the indicator indicating that the parameter set update cannot occur in the portion of the bitstream, means for activating a first parameter set of a particular type with a particular identification value for the entire portion of the bitstream.

In an additional example, the disclosure is directed toward a computer-readable medium comprising instructions for coding video data, the instructions, when executed, cause one or more processors to code an indicator that indicates whether a parameter set update can occur in a portion of a bitstream, wherein a parameter set update includes storing a current parameter set to replace a previous parameter set of a same type and having a same identification value. Based on the indicator indicating that the parameter set update cannot occur in the portion of the bitstream, the instructions cause the processors to activate a first parameter set of a particular type with a particular identification value for the entire portion of the bitstream.

The details of one or more examples are set forth in the accompanying drawings and the description below. Other features, objects, and advantages will be apparent from the description and drawings, and from the claims.

DETAILED DESCRIPTION

The techniques of this disclosure provide an indication of whether a parameter set update can occur in a portion of a bitstream. The portion of the bitstream may be a coded video sequence of the bitstream or a group of pictures (GOP) in the coded video sequence of the bitstream. The indication may enable a video decoder to determine whether an update of a stored parameter set can occur without performing a content comparison between the stored parameter set and a new parameter set of the same type with the same identification value. A parameter set update includes storing a current parameter set with a given identification value to replace a previous parameter set of the same type and having the same identification value. When a parameter set update cannot occur, the video decoder may store and activate a single parameter set of a given type for the entire portion of the bitstream. When a parameter set update can occur, the video decoder may automatically activate a new parameter set and deactivate a stored parameter set of a given type, or may determine whether to update the stored parameter, e.g., by performing a content comparison.

The indication may comprise a bitstream-level indication, such as a syntax element included in the portion of the bitstream. For example, the indication may comprise a flag included in supplemental enhancement information (SEI) network abstraction layer (NAL) units in the bitstream. As another example, the indication may comprise a flag included in sequence parameter set (SPS) NAL units in the bitstream. In one example, the techniques include decoding a flag that indicates whether any parameter set can be updated in a portion of a bitstream. In this case, the same flag may be used for all types of parameter sets, including video parameter sets (VPSs), sequence parameter sets (SPSs), picture parameter sets (PPSs), and/or adaptive parameter sets (APSs). In particular, a single flag may indicate whether any of the parameter sets in the bitstream can be updated. In another example, the techniques include decoding several different flags, each of which indicates whether a parameter set of a particular type can be updated in the portion of the bitstream.

Figure 1:
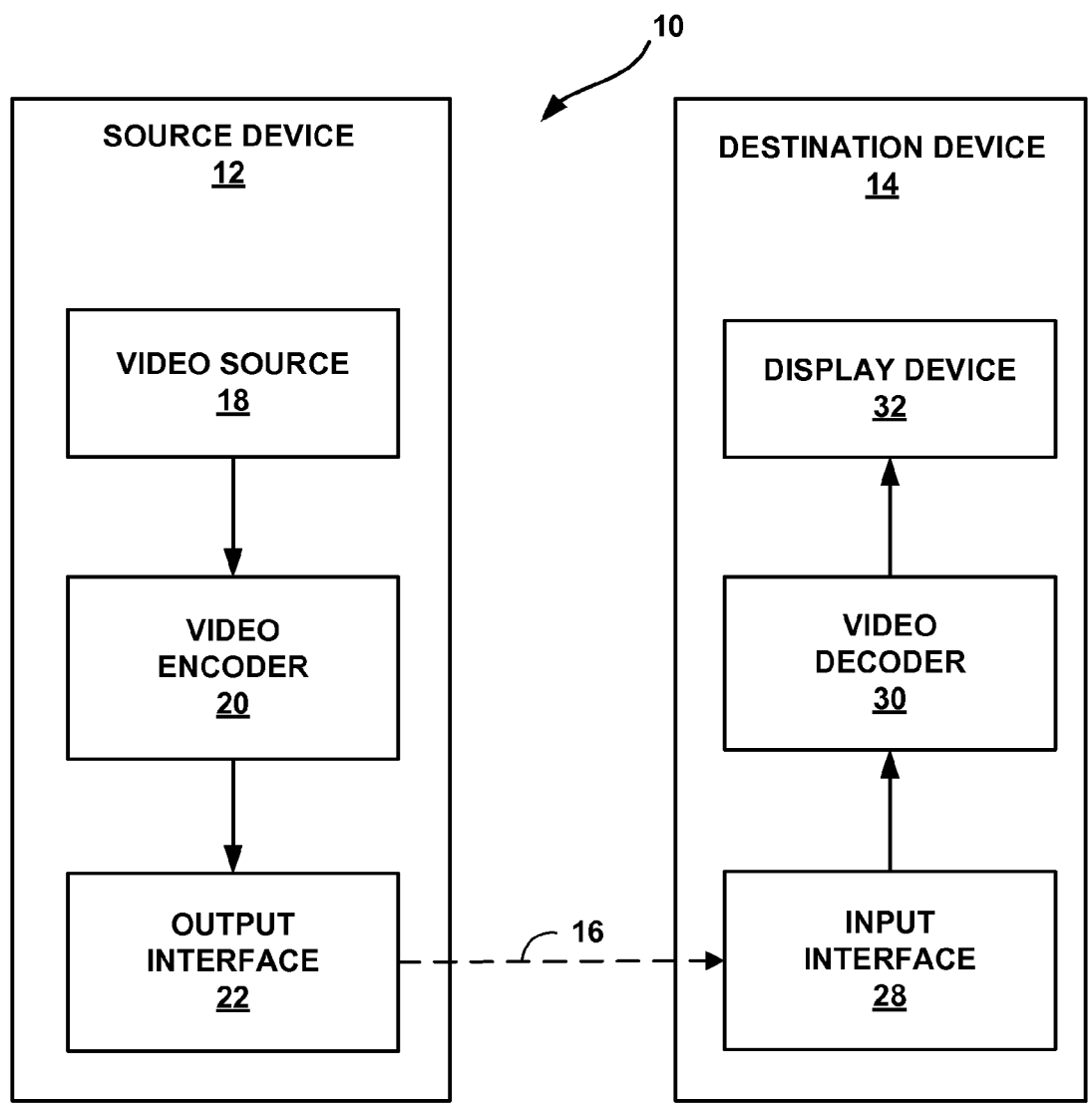
FIG. 1 is a block diagram illustrating an example video encoding and decoding system that may utilize the techniques described in this disclosure.

FIG. 1 is a block diagram illustrating an example video encoding and decoding system 10 that may utilize the techniques described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet as dynamic adaptive streaming over HTTP (DASH), encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques of this disclosure may be performed by any digital video encoding and/or decoding device. Although generally the techniques are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG) as the product of a collective partnership known as the Joint Video Team (JVT). The HEVC standard may conform to the HEVC Test Model (HM). A recent draft of the HEVC HM, referred to as "HEVC Working Draft 6" or "WD6," is described in document JCTVC-H1003, Bross et al., "High efficiency video coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February 2012.

The techniques of this disclosure, however, are not limited to any particular coding standard. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities relative to existing standards. For example, whereas H.264 provides nine intra-prediction encoding modes, the HM may provide as many as thirty-three intra-prediction encoding modes.

In general, the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as a residual quadtree (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units.

Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Video encoder 20 and video decoder 30 may be configured to implement one or more of the techniques described in this disclosure. As one example, video encoder 20 may be configured to encode an indication of whether a parameter set update can occur in a portion of a bitstream. Video decoder 30 may be configured to decode the indication to determine whether an update of a stored parameter set can occur without performing a content comparison between the stored parameter set and a new parameter set of the same type with the same identification value. When a parameter set update occurs, video decoder 30 stores a current parameter set with a given identification value to replace a previous parameter set of the same type and having the same identification value. The portion of the bitstream to which the indication applies may be a coded video sequence of the bitstream or a GOP in the coded video sequence of the bitstream.

In one case, the indication may comprise a syntax element, such as a flag, in the bitstream that indicates whether any parameter set of any type can be updated in a portion of a bitstream. In another case, the indication may comprise several different flags in the bitstream, each of which indicates whether a parameter set of a particular type can be updated in the portion of the bitstream. In either case, when a flag indicates that a parameter set update cannot occur, video decoder 30 may store and activate a single parameter set of a given type for the entire portion of the bitstream. Upon receiving a subsequent parameter set of the same type and having a same identification value as the initial parameter set, video decoder 30 can ignore the subsequent parameter set. Conversely, when a flag indicates that a parameter set update can occur, video decoder 30 may automatically activate a new parameter set and deactivate a stored parameter set of a given type, or may determine whether to update the stored parameter, e.g., by performing a content comparison.

As another example, video encoder 20 may be configured to encode an indication of whether performing random access from a particular CRA access unit in a bitstream requires fetching of parameter sets from previous access units. Video decoder 30 may be configured to decode the indication to determine whether parameter sets included in previous access units are needed to perform random access from a particular CRA picture. In some cases, the indication may comprise a syntax element, such as a flag, included in a NAL unit payload included in an access unit for each CRA picture in the bitstream.

The CRA access unit may occur at any point within a coded video sequence and does not clean the DPB, which provides more options for random access to the bitstream without lower coding efficiency. In the case of random access from a CRA picture, all pictures preceding the CRA picture in output or decoding order will not be decoded and are unavailable for use as reference pictures. In order to decode the CRA picture or any following pictures in output or decoding order, a video decoder may need to fetch one or more parameter sets included in an access unit for one of the unavailable previous pictures, which is a burdensome operation. According to some of the techniques of this disclosure, when the flag indicates that no parameter sets from previous access units are needed for random access from a particular CRA picture, video decoder 30 may determine to perform random access from that picture because no fetching operation is required. Conversely, when the flag indicates that parameter sets from previous access units are needed for random access from a particular CRA picture, video decoder 30 may determine to not perform random access from that picture in order to avoid the fetching operation. Although primarily described with respect to CRA pictures, the techniques may similarly be used for other types of RAP pictures, including IDR pictures and gradual decoding refresh (GDR) pictures.

Figure 2:
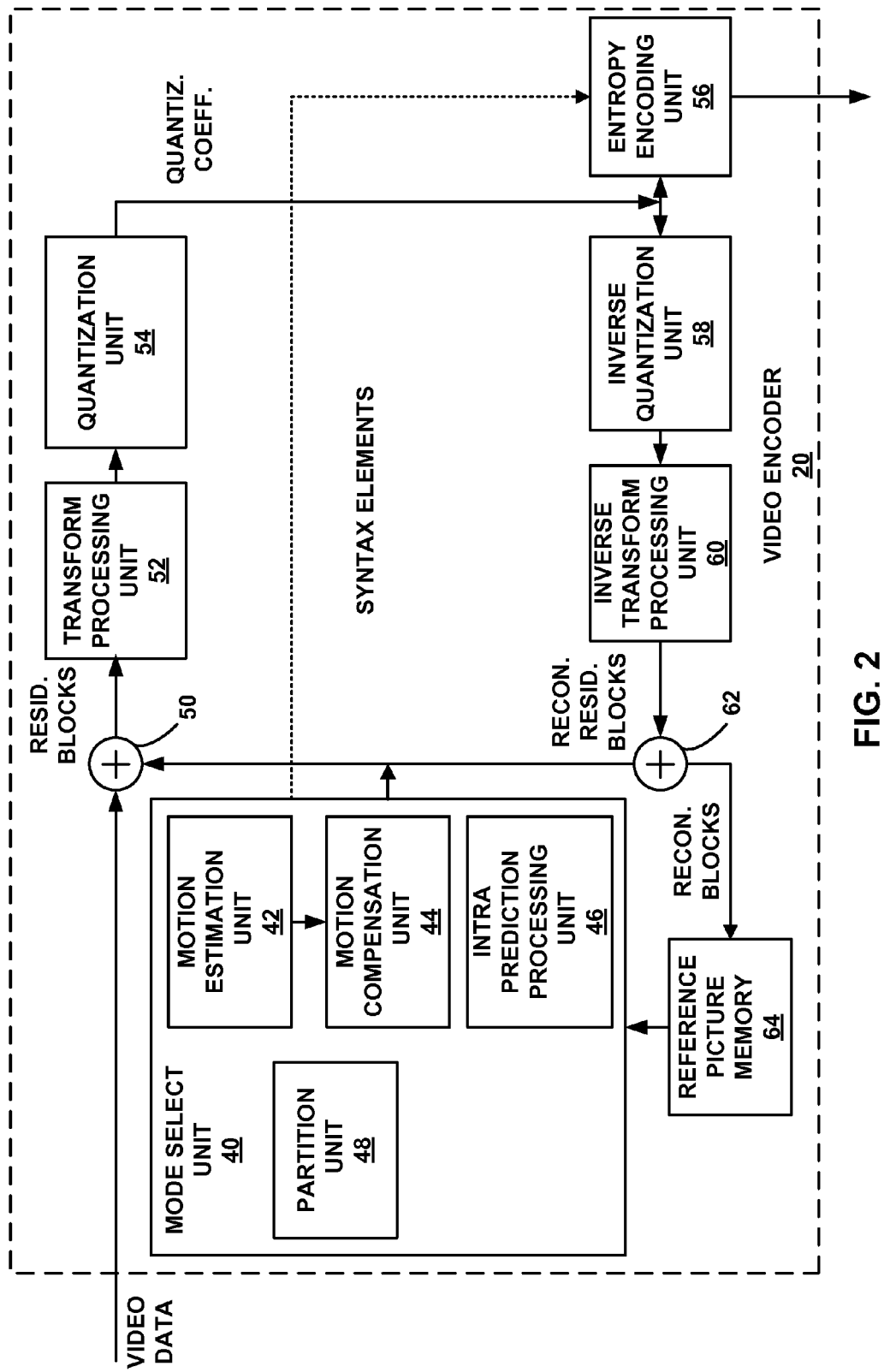
FIG. 2 is a block diagram illustrating an example video encoder that may implement the techniques described in this disclosure.

FIG. 2 is a block diagram illustrating an example of video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction processing unit 46, and partition unit 48. For video block reconstruction, video encoder 20 also includes inverse quantization unit 58, inverse transform processing unit 60, and summer 62.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction processing unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64, which may also be referred to as a decoded picture buffer (DPB). For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes.

For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction processing unit 46 may calculate ratios from the distortions and rates for the various encoded blocks to determine which intra-prediction mode exhibits the best rate-distortion value for the block.

After selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64.

Video encoder 20 of FIG. 2 represents an example of a video encoder configured to implement one or more of the techniques described in this disclosure. In one example of the techniques, video encoder 20 may be configured to encode an indication of whether a parameter set update can occur in a portion of a bitstream. The indication may be generated by video encoder 20 in order to notify a video decoder of whether an update of a stored parameter set can occur. In this way, based on the indication, the video decoder first determines whether a parameter set update is even allowed in the portion of the bitstream before determining whether to actually perform an update, e.g., by performing a content comparison between a stored active parameter set and a new parameter set of the same type with the same identification value.

In some cases, the indication may comprise a single indication of whether any of the parameter sets for a portion of a bitstream, e.g., a coded video sequence or a GOP, can be updated. In this case, the same indication may be used for all types of parameter sets, including video parameter sets (VPSs), sequence parameter sets (SPSs), picture parameter sets (PPSs), and/or adaptive parameter sets (APSs). In other cases, the indication may comprise several different indications, each of which indicates whether a parameter set of a particular type can be updated in the portion of the bitstream. The indication may be a bitstream-level indication, such as a syntax element included in the portion of the bitstream. For example, the indication may be a syntax element, such as a flag, included in supplemental enhancement information (SEI) network abstraction layer (NAL) units in the bitstream. As another example, the indication may be a syntax element, such as a flag, included in sequence parameter set (SPS) NAL units in the bitstream.

In other examples, the indication may be a requirement in a profile definition. In additional examples, the indication may be defined as a media type parameter and included in the session description protocol (SDP) when the video bitstream is used in a real-time transport protocol (RTP) based transmission environment, such as streaming or multicast using RTP for media data transport. In this case, the indication may be used in a session negation phase, also known as a capability exchange. In still other examples, the indication may be defined as a stream property included in a media presentation description (MPD) in a hypertext transfer protocol (HTTP) streaming environment, such as DASH.

In another example of the techniques, video encoder 20 may be configured to encode an indication for each CRA picture of whether performing random access to a bitstream from the CRA access unit requires fetching of parameter sets from previous access units. The indication may be generated by video encoder 20 in order to notify a video decoder whether parameter sets included in previous access units are needed to perform random access from a particular CRA access unit. In this way, based on the indication, the video decoder first determines whether a fetching operation is required for random access decoding from the particular CRA access unit, and may avoid performing a fetching operation by selecting a different RAP picture from which to perform random access. The indication is especially useful for CRA access unit introduced in the HEVC standard because CRA pictures can be positioned at any point within a coded video sequence and do not clean the DPB, which provides more options for random access to the bitstream without lower coding efficiency.

In some cases, the indication may comprise a particular type of NAL unit, e.g., a particular type of SPS, SEI or access unit delimiter NAL unit, included in an access unit for each CRA picture in a bitstream. In other cases, the indication may comprise a syntax element, such as a flag, included in a NAL unit payload, e.g., a SPS, SEI or access unit delimiter NAL unit payload, or a NAL unit header included in an access unit for each CRA picture in the bitstream. In one example, the indication may comprise a flag included in a SEI NAL unit in the access unit for the CRA picture. Although primarily described with respect to CRA pictures, video encoder 20 may encode similar indications for other types of RAP pictures, including IDR pictures and gradual decoding refresh (GDR) pictures.

Figure 3:
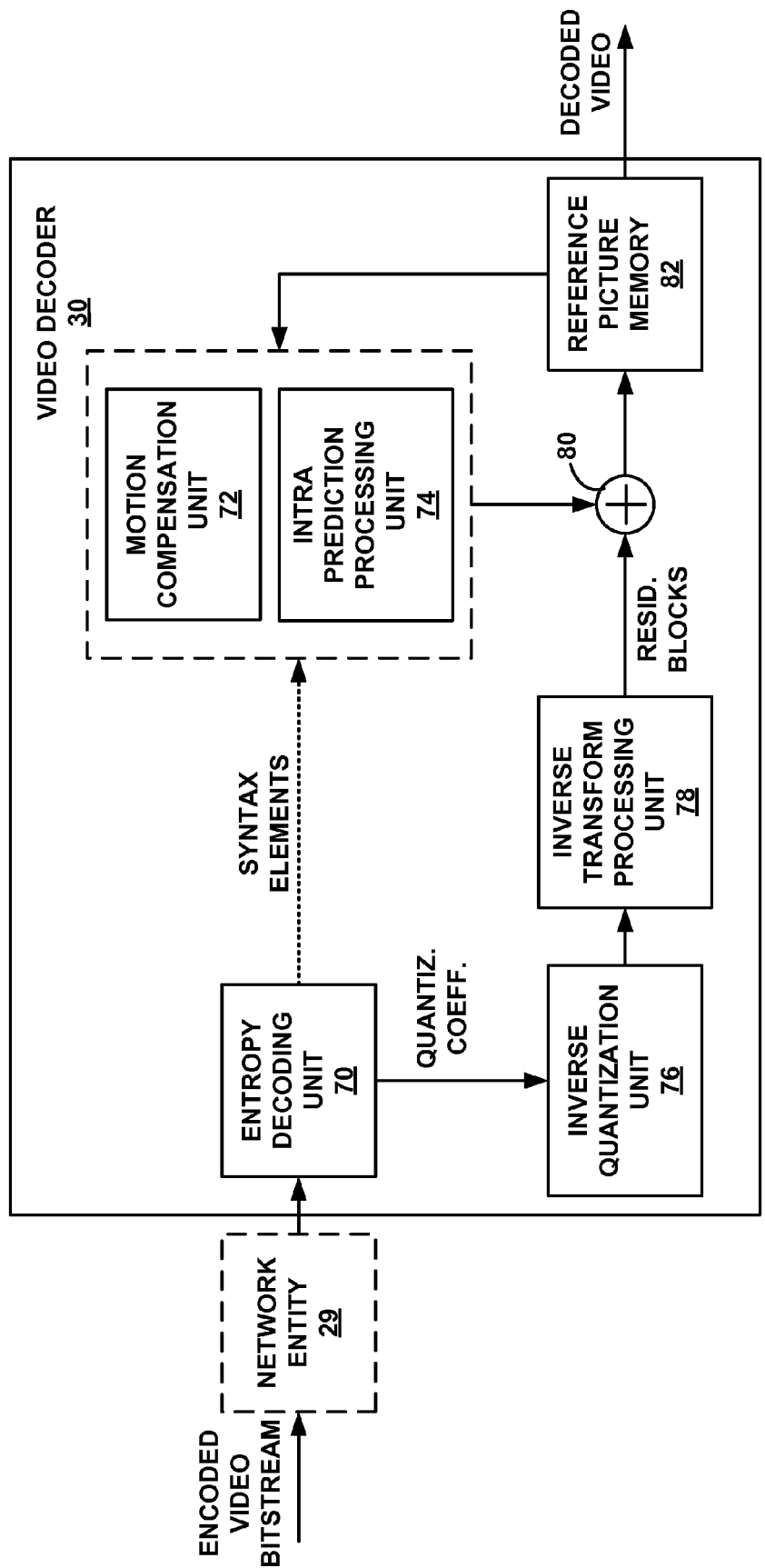
FIG. 3 is a block diagram illustrating an example video decoder that may implement the techniques described in this disclosure.

FIG. 3 is a block diagram illustrating an example of video decoder 30, which decodes an encoded video sequence. In the example of FIG. 3, video decoder 30 includes an entropy decoding unit 70, motion compensation unit 72, intra-prediction processing unit 74, inverse quantization unit 76, inverse transform processing unit 78, summer 80, and reference picture memory 82. Video decoder 30 may, in some examples, perform a decoding pass generally reciprocal to the encoding pass described with respect to video encoder 20 (FIG. 2).

During the decoding process, video decoder 30 receives an encoded video bitstream that represents video blocks of an encoded video slice and associated syntax elements from video encoder 20. Video decoder 30 may receive the encoded video bitstream from a network entity 29. Network entity 29 may, for example, be a streaming server, a media-aware network element (MANE), a video editor/splicer, an intermediate network element, or other such device configured to implement one or more of the techniques described above. Network entity 29 may include an external means configured to perform some of the techniques of this disclosure. Some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30.

Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction processing unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, based on reference pictures stored in reference frame memory 82, which may be referred to as a decoded picture buffer (DPB).

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference frame memory 82 also stores decoded video for later presentation on a display device, such as display device 32 of FIG. 1.

Video decoder 30 of FIG. 3 represents an example of a video decoder configured to implement one or more of the techniques described in this disclosure. In one example of the techniques, video decoder 30 may be configured to decode an indication of whether a parameter set update can occur in a portion of a bitstream. When the indication indicates that a parameter set update cannot occur in a portion of a bitstream, video decoder 30 activates an initial parameter set of a given type for the entire portion of the bitstream. In this case, upon receiving a subsequent parameter set of the same type and having a same identification value as the initial parameter set, video decoder 30 does not need to determine whether to update the initial parameter set for the coded video sequence and can ignore the subsequent parameter set.

The HEVC HM includes the concept of parameter sets. A parameter set is a syntax structure that includes syntax elements configured to indicate information that enables a video decoder to reconstruct coded video. The syntax elements may be included in a particular type of parameter set based on the information indicated by the syntax elements and the frequency with which the syntax elements are expected to change in the bitstream. For example, a video parameter set (VPS) includes syntax elements that describe the overall characteristics of coded video sequences including dependencies between temporal sublayers. A sequence parameter set (SPS) includes syntax elements that are expected to remain unchanged for pictures within a sequence of pictures (e.g., picture order, number of reference pictures, and picture size). A picture parameter set (PPS) includes syntax elements that may change from picture-to-picture within a sequence (e.g., entropy coding mode, quantization parameters, and bit depth). An adaptive parameter set (APS) includes syntax elements that are expected to change within pictures of a sequence (e.g., block size, and deblock filtering).

The parameter set concept decouples the transmission of infrequently changing information from the transmission of coded video data. In some examples, the parameter sets may be conveyed "out-of-band" (i.e., not transported together with the units containing coded video data). It may be desirable to transmit the parameter sets out-of-band, because out-of-band transmission is typically more reliable than "in-band" transmission within the data channel. In the HEVC HM, each VPS includes a VPS identification (ID) value, each SPS includes an SPS ID and references a VPS using a VPS ID, and each PPS includes a PPS ID and references an SPS using an SPS ID. In addition, each slice header references a PPS using a PPS ID.

In a bitstream, when a parameter set of a particular type with a particular parameter set ID value has different content than a previous parameter set (in bitstream order or decoding order) of the same type with the same ID value, the particular type of parameter set with that particular ID value may be updated. When a parameter set update occurs, video decoder 30 stores the current parameter set with the given ID value to replace the previous parameter set of the same type and having the same ID value.

The parameter set update may occur when a new parameter set of a particular type is needed, but all the possible ID values have been used. The parameter set update may also occur in spliced bitstreams even when the parameter set ID value spaces are not fully utilized. Bitstream splicing refers to the combination of two or more bitstreams or parts of bitstreams. A first bitstream may be appended by a second bitstream, possibly with some modifications to either one or both of the bitstreams to generate a spliced bitstream. The first coded picture in the second bitstream is also referred to as the splicing point. The picture at the splicing point in the spliced bitstream originated from the second bitstream while the picture immediately preceding the splicing point in the spliced bitstream originated from the first bitstream.

Bitstreams typically use a few parameter sets of each type, e.g., a few SPSs and a few PPSs, and sometimes use only one parameter set of each type. In addition, each of the bitstreams typically starts with the smallest parameter set ID value 0 for each of the different types of parameter sets. In this way, if two bitstreams are spliced, it is likely that the same ID value for a particular type of parameter set, e.g., SPS with ID value 0, is referred to by both the splicing point and the picture immediately preceding the splicing point picture, but that the two parameter sets include different content. The parameter set referred to by the picture preceding the splicing point, therefore, needs to be updated with the parameter set of the same type with the same ID value referred to by the splicing point picture. In this case, parameter sets of the spliced bitstream cannot be transmitted in the beginning of the spliced bitstream and, therefore, cannot be transmitted out-of-band from the coded video sequence of the bitstream.

Conventionally, in order to determine whether a current parameter set of any type with a particular ID value should be activated to update a previous parameter set with the same ID value, a video decoder compares content of the current parameter set with content of the previous parameter set to determine if the content is different. When the content of the current parameter set is different than the previous parameter set, the video decoder activates the current parameter set for the bitstream and deactivates the previous parameter set. The video decoder performs this content comparison each time it receives a new parameter set of a particular type having a particular ID value that is the same as an earlier received parameter set. When parameter sets are transmitted in-band, i.e., with a coded video sequence of the bitstream, the video decoder may receive repeated transmissions of the parameter sets for improved error resilience. The video decoder then performs the content comparison for each repeated parameter set. This content comparison is unnecessary and imposes a computational burden to the video decoder.

The techniques described in this disclosure provide an indicator configured to indicate whether a parameter set update can occur in a portion of a bitstream (e.g., a coded video sequence or a GOP in the coded video sequence). When the indicator indicates that the parameter set update cannot occur in the portion of the bitstream, video decoder 30 stores and activates only a first parameter set with a particular ID value for the entire portion of the bitstream. In addition, when the indicator indicates that the parameter set update cannot occur, video decoder 30 will not perform any parameter set update and, therefore, does not need to compare the content of the first parameter set with content of a second parameter set of the same type with the same ID value. In this way, video decoder 30 may operate as if the content of the first parameter set is identical to content included in any other parameter set of the same type having the same ID value.

When the indicator indicates that a parameter set update can occur in the portion of the bitstream, video decoder 30 stores and activates a first parameter set with a particular ID value, but may update the stored first parameter set using a second parameter set of the same type with the same ID value to replace the stored first parameter set. In some cases, video decoder 30 may automatically activate the second parameter set for the portion of the bitstream, and deactivate the first parameter set. In other cases, video decoder 30 may compare content of the first parameter set to content of the second parameter set. When the content of the second parameter set is different than the content of the first parameter set, video decoder 30 activates the second parameter set for the portion of the bitstream, and deactivates the first parameter set.

The indication may comprise a bitstream-level syntax element, such as a flag, included in the bitstream. For example, the indication may comprise a flag included in one or more supplemental enhancement information (SEI) network abstraction layer (NAL) units associated with a coded video sequence in the bitstream. As another example, the indication may comprise a flag included in one or more sequence parameter set (SPS) NAL units for the coded video sequence in the bitstream.

In one example, the flag may indicate whether any parameter set can be updated in the portion of the bitstream. Hence, a single flag may be used to indicate update status for different types of parameter sets. In this case, the same flag may be used for all types of parameter sets, including VPSs, SPSs, PPSs, and/or APSs. When the flag is equal to 1, a parameter set may be updated. When the flag is equal to 0, no parameter set shall be updated and video decoder 30 does not perform content comparisons between the parameter sets of the same type and with the same parameter set ID values. When the flag is equal to 0, the content comparisons are not necessary because video decoder 30 may operate as if the parameter sets of the same type and with the same ID values have the same content.

In another example, the flag may indicate whether a parameter set of a particular type can be updated in the portion of the bitstream. In this case, a different flag may be used for each of the different types of parameter sets, including VPSs, SPSs, PPSs, and/or APSs. Hence, each type of parameter set may, in effect, have its own flag to indicate whether it can be updated. When the flag is equal to 1, a parameter set of the particular type may be updated. When the flag is equal to 0, no parameter set of the particular type shall be updated and video decoder 30 does not perform content comparisons between the parameter sets of the particular type and with the same parameter set ID values. When the flag is equal to 0, the content comparisons are not necessary because video decoder 30 may operate as if the parameter sets of the particular type and with the same ID values have the same content.

In a further example, the flag may indicate whether two or more parameter sets of different types may be updated in the portion of the bitstream. In this case, one flag may be used for two or more of the different types of parameter sets, e.g., SPSs and PPS, and another flag may be used for one or more of the different types of parameters sets, e.g., VPSs. Hence, some types of parameter sets may share a flag to indicate joint update status, while other types of parameter sets may have individual flags to indicate individual update status. In addition, in some cases, the indication may comprise a bitmask or codeword that is a single syntax element with multiple bits, where each bit corresponds to the update status of one or more of the parameter sets, or a codeword has a particular value to indicate different combinations of the update statuses for the different parameter sets.

In some cases, the indication of whether a parameter set update can occur in the portion of the bitstream may determine how the parameter sets are transmitted to video decoder 30. For example, when parameter set updates can occur in the portion of the bitstream, the parameter sets may not be transmitted out-of-band from the coded video sequence of the bitstream because updates may occur for different portions the bitstream, e.g., at splicing point pictures of a spliced bitstream.

According to the techniques, in one example, when the indicator indicates that a parameter set update cannot occur in the portion of the bitstream, video decoder 30 may receive the first parameter set in an out-of-band transmission, i.e., a transmission separate from a coded video sequence of the bitstream. In this case, since the first parameter set is the only parameter set activated for the entire bitstream, a video encoder, such as video encoder 20 may encode the first parameter set out-of-band, such that the first parameter set is separate from the coded video sequence data. In another example, when the indicator indicates that a parameter set update cannot occur in the portion of the bitstream, video decoder 30 may receive the first parameter set in an in-band transmission, i.e., a transmission with a coded video sequence of the bitstream, without comparing content for any repeated transmission of the first parameter set. In this case, when a video encoder, such as video encoder 20, encodes repeated transmissions of the first parameter set for improved error resilience, video decoder 30 does not perform a content comparison for the repeated parameter sets. The content comparisons are not necessary because, according to the indication, video decoder 30 may operate as if the parameter sets of the same type and with the same ID values have the same content.

In some examples, the indication may be a syntax element, such as a flag, included in a bitstream, e.g., in a VPS, SPS, PPS or APS. As one example, the indication may be a syntax element included in a coded video sequence. As another example, indication may be a requirement in a profile definition. In other examples, the indication may be defined as a media type parameter and included in the session description protocol (SDP) when the video bitstream is used in a real-time transport protocol (RTP) based transmission environment, such as streaming or multicast using RTP for media data transport. In this case, the indication may be used in a session negation phase, also known as capability exchange. In still other examples, the indication may be defined as a stream property included in a media presentation description (MPD) in a hypertext transfer protocol (HTTP) streaming environment, such as DASH.

In another example of the techniques, video decoder 30 may be configured to decode an indication for each CRA picture of whether performing random access to a bitstream from the CRA access unit requires fetching of parameter sets from previous access units. The indication is especially useful for CRA access units introduced in the HEVC standard because CRA pictures can be positioned at any point within a coded video sequence and do not clean the DPB, which provides more options for random access to the bitstream without lower coding efficiency.

When the indication indicates that no parameter sets from previous access units are needed for random access from a particular CRA picture, video decoder 30 may determine to perform random access from that CRA picture with no fetching operation. When the indication indicates that parameter sets from previous access units are needed for random access from a particular CRA picture, video decoder 30 may determine to not perform random access from that picture in order to avoid the fetching operation. In some cases, video decoder 30 may decode indications for several different CRA pictures within a portion, e.g., a coded video sequence, of the bitstream in order to identify an access unit from which random access can be performed without performing a parameter set fetching operation. In this way, video decoder 30 may avoid performing a fetching operation by selecting a different CRA picture from which to perform random access.

Random access refers to a decoding of a video bitstream starting from a coded picture that is not the first coded picture in the bitstream. Random access to a bitstream is needed in many video applications, such as broadcasting and streaming, e.g., for users to switch between different channels, to jump to specific parts of the video, for splicing of different bitstreams, or to switch to a different bitstream for stream adaptation of the bit rate, frame rate, spatial resolution, and the like. This feature is enabled by inserting random access pictures or random access points in regular intervals into the video bitstream. An instantaneous decoder refresh (IDR) picture can be used for random access. An IDR picture starts a coded video sequence and always cleans the decoded picture buffer (DPB), so pictures following the IDR picture in decoding order cannot use pictures decoded prior to the IDR picture for reference. Consequently, bitstreams relying on IDR pictures for random access may have significantly lower coding efficiency.

In order to improve the coding efficiency, the concept of clean random access (CRA) pictures was introduced in the HEVC HM. Unlike IDR pictures, CRA pictures can be positioned at any point within a coded video sequence and do not clean the DPB, which provides more options for random access to the bitstream without lower coding efficiency. Because a CRA picture does not clean the DPB, pictures that follow the CRA picture in decoding order but precede it in output order are allowed to use pictures decoded before the CRA picture for reference. Pictures that follow a CRA picture in decoding order but precede the CRA picture in output order are referred to as leading pictures of the CRA picture. The leading pictures of a CRA picture can be correctly decoded if the decoding starts from an IDR or CRA picture that precedes the current CRA picture. The leading pictures of a CRA picture cannot be correctly decoded, however, when random access occurs from the current CRA picture. The leading pictures, therefore, are typically discarded from the DPB during random access decoding. To prevent error propagation from reference pictures that may not be available depending on where the decoding starts, all pictures that follow a CRA picture both in decoding order and output order may be constrained to not use any picture that precedes the CRA picture either in decoding order or output order (which includes the leading pictures) as reference.

Similar random access functionalities are supported in the H.264/AVC standard with a recovery point SEI message. An H.264/AVC decoder implementation may or may not support the recovery point SEI message functionality. In the HEVC standard, a bitstream starting with a CRA picture is considered a conforming bitstream. When a bitstream starts with a CRA picture, the leading pictures of the CRA picture may refer to unavailable reference pictures and, therefore, are not decodable. The HEVC standard specifies that the leading pictures of the starting CRA picture are not output. For establishment of bitstream conformance, however, the HEVC standard specifies a decoding process to generate unavailable reference pictures for decoding the non-output leading pictures. Conforming decoder implementations do not have to follow that decoding process as long as identical output can be generated compared to when the decoding process is performed from the beginning of the coded video sequence.

In addition, a conforming bitstream in the HEVC standard may contain no IDR pictures at all, and, consequently, may contain a subset of a coded video sequence or an incomplete coded video sequence. In the HEVC standard, a coded video sequence is defined as a sequence of access units that includes, in decoding order, an IDR access unit followed by zero or more non-IDR access units including all subsequent access units up to but not including any subsequent IDR access unit. The access units included in the coded video sequence correspond to pictures of the video sequence. Each of the access units includes one or more network abstraction layer (NAL) units. The HEVC standard defines video coded layer (VCL) NAL units and non-VCL NAL units. A VCL NAL unit contains a slice of video data for the picture. A non-VCL NAL unit contains information other than a slice of video data. For example, a non-VCL NAL unit may contain delimiter data or a parameter set, such as a VPS, SPS or PPS. Another example of a non-VCL NAL unit is an SEI NAL unit that may include picture timing messages used by a video decoder when decoding the bitstream.

When video decoder 30 performs random access from a CRA picture included in a bitstream, all pictures preceding the CRA picture in output or decoding order will not be decoded and are unavailable for use as reference pictures. In this case, in order to decode the CRA picture or any following pictures in output or decoding order, video decoder 30 may need to fetch one or more parameter sets included in an access unit for one of the unavailable previous pictures, which is a burdensome operation.

As an example, an SPS may be included in an access unit for a first CRA picture of the bitstream and no SPS may be included in a subsequent second CRA picture of the bitstream. In this case, if random access is performed from the second CRA picture and all previous pictures, including the first CRA picture, are unavailable, the SPS is also not available for decoding the second CRA picture and any subsequent pictures in the bitstream. In order to perform random access from the second CRA picture, video decoder 30 needs to fetch the SPS from the unavailable first CRA picture.

Conventionally, to avoid the fetching operation, a video decoder may perform a check through a received bitstream to determine which parameter sets are used for different portions of the bitstream and whether random access is available from RAP pictures in the bitstream. Both the fetching operation and the bitstream check operation may be processor-intensive, burdensome operations for the video decoder and it would be desirable to avoid these operations.

The techniques of this disclosure provide an indication of whether performing random access from a particular CRA access unit in a bitstream requires fetching of parameter sets from previous access units. When no previous parameter sets are needed for random access from a particular CRA access unit, video decoder 30 may perform random access from that particular CRA access unit without a fetching operation. Conversely, when previous parameter sets are needed for random access from the particular CRA access unit, video decoder 30 may not perform random access from that particular CRA access unit in order to avoid the fetching operation. In some examples, when previous parameter sets are needed for random access from the particular CRA access unit, video decoder 30 may perform random access from that CRA access unit after fetching the parameters sets from the previous access units.

According to the techniques described in this disclosure, an indication may be included in the bitstream for each CRA access unit to indicate whether parameter sets included in previous access units in output or decoding order are needed to decode the CRA access unit and all subsequent access units in output or decoding order. If no previous parameter sets are needed for random access from one CRA access unit, video decoder 30 may perform random access to the bitstream from that access unit without relying on any parameter set NAL units included in previous access units. In this way, all earlier NAL units may be simply skipped or ignored.

As in the example set forth above, an SPS NAL unit may be included in an access unit for a first CRA picture of the video sequence and no SPS NAL unit may be included in a subsequent second CRA picture of the video sequence. According to the techniques described in this disclosure, an indication may be included in the access unit for the first CRA picture to indicate that no parameter set from a previous access unit in output or decoding order is needed to decode the first CRA picture or any subsequent pictures in output or decoding order. In addition, an indication may be included in the access unit for the second CRA picture to indicate that a parameter set from a previous access unit in output or decoding order (i.e., the SPS in the access unit for the first CRA picture) is needed to decode the second CRA picture or any subsequent pictures in output or decoding order. In this example, based on the indications, video decoder 30 may determine to perform random access from the first CRA picture, but not perform random access from the second CRA picture in order to avoid the fetching operation.

Although primarily described with respect to CRA pictures, the techniques of this disclosure may similarly be used for other types of RAP pictures, including IDR pictures and gradual decoding refresh (GDR) pictures. In some cases, the indication may comprise a particular type of network abstraction layer (NAL) unit included in an access unit for each IDR or CRA picture in a coded video sequence. In other cases, the indication may comprise a syntax element, such as a flag, included in a NAL unit payload included in an access unit for each IDR or CRA picture in the coded video sequence. In one example, the indication may comprise a flag included in a supplemental enhancement information (SEI) NAL unit in the access unit for the CRA picture.

In addition, for example, the indication for a given picture may be signaled using a particular type of SPS with a distinct NAL unit type. In this example, the particular type of SPS may be required to be included in the first NAL unit in the access unit for the picture, or the first NAL unit after an access unit delimiter NAL unit (if present). In another example, the indication for a given picture may be signaled using a particular type of access unit delimiter with a distinct NAL unit type or a flag included in a payload of an access unit delimiter NAL unit in the access unit for the picture. In a further example, the indication for a given picture may be signaled using a flag included in a NAL unit header in the access unit for the picture. In addition, the indication for a given picture may be signaled using a particular type of SEI message or a flag in an SEI message. In the HEVC HM, the SEI message may be included in a SEI NAL unit in the access unit for the picture.

Figure 4:
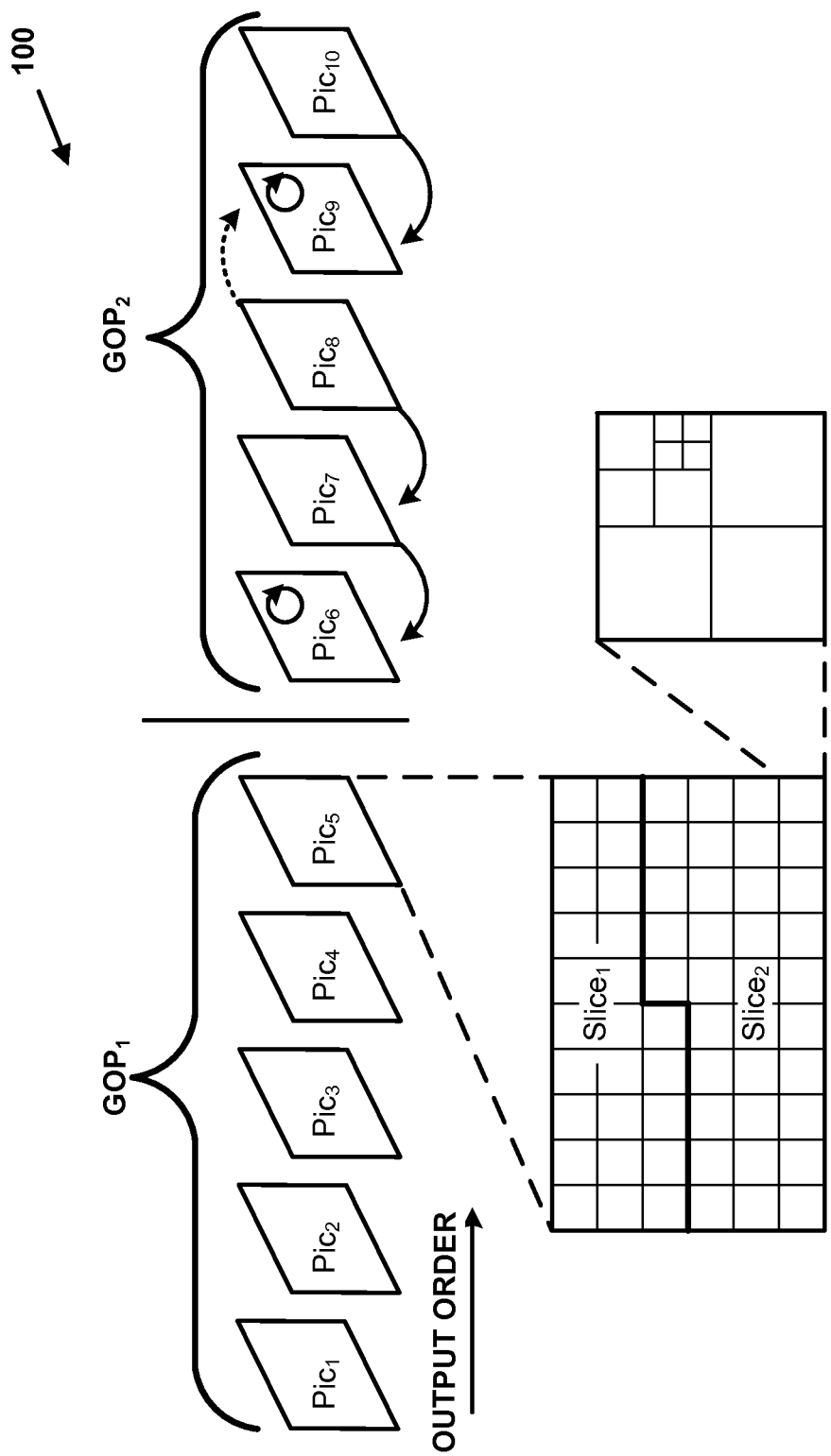
FIG. 4 is a conceptual diagram illustrating a video sequence coded according to predictive video coding techniques.

FIG. 4 is a conceptual diagram illustrating a video sequence 100 coded according to predictive video coding techniques. As illustrated in FIG. 4, video sequence 100 includes pictures $Pic_1$-$Pic_{10}$. Pictures $Pic_1$-$Pic_{10}$ are arranged and sequentially numbered according to the order in which they are to be displayed. As described in more detail below, output or display order does not necessarily correspond to a decoding order. As illustrated in FIG. 4, video sequence 100 includes $GOP_1$ and $GOP_2$, where pictures $Pic_1$-$Pic_5$ are included in $GOP_1$ and pictures $Pic_6$-$Pic_{10}$ are included in $GOP_2$. FIG. 4 further illustrates $Pic_5$ as being partitioned into $slice_1$ and $slice_2$, where each of $slice_1$ and $slice_2$ includes consecutive LCUs according to a left-to-right top-to-bottom raster scan. In addition, the last LCU in $Pic_5$ is illustrated as being further split into multiple CUs according to a quadtree. Although not shown, the other pictures illustrated in FIG. 4 may be partitioned into one or more slices in a similar manner.

As described in more detail below, the HEVC HM includes two types of slice partitioning schemes, namely regular slices and entropy slices. Further, in addition to slice partition schemes, the HM also includes tile and Wavefront Parallel Processing (WPP) partitioning schemes. A partitioning scheme may be selected and applied based on a maximum transmission unit (MTU) size matching and/or parallel processing. $Slice_1$ and $slice_2$ of $Pic_5$, or any of the other pictures, may be regular slices or entropy slices. Further, in other examples, each of $Pic_1$-$Pic_{10}$ may be partitioned using tiles or WPP.

In addition, FIG. 4 illustrates the concept of I slices, P slices, and B slices with respect to $GOP_2$ of video sequence 100. The arrows associated with each of $Pic_6$-$Pic_{10}$ in $GOP_2$ indicate whether a picture includes I slices, P slices, or B slices based on a referenced picture indicated by the arrows. In video sequence 100, $Pic_6$ and $Pic_9$ represent pictures including I slices (i.e., intra-predicted slices based on references within the picture itself), pictures $Pic_7$ and $Pic_{10}$ represent pictures including P slices (i.e., inter-predicted slices based on references in a previous picture) and $Pic_8$ represents a picture including B slices (i.e., inter-predicted slices bases on references in both a previous and a subsequent picture).

Figure 5:
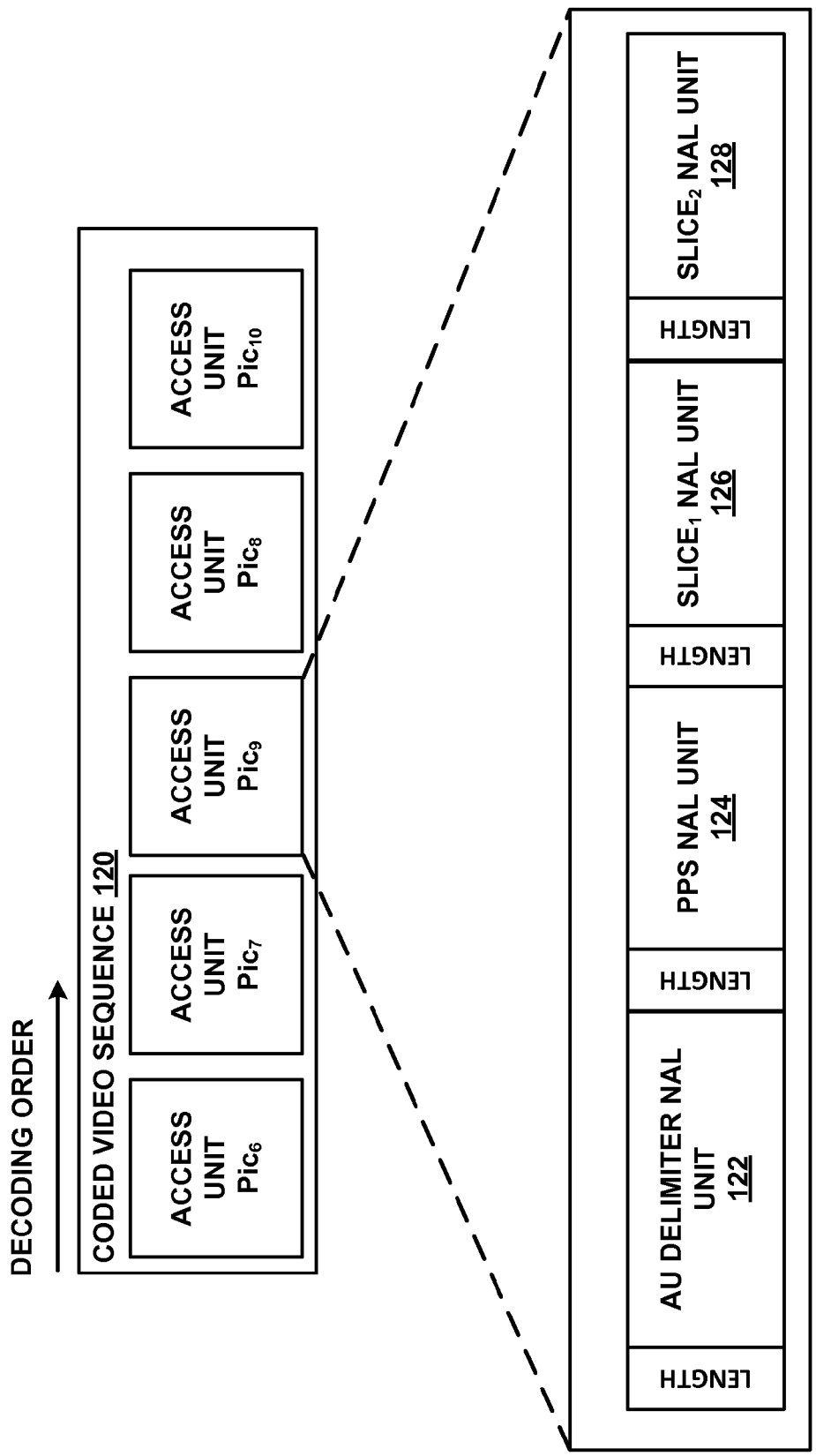
FIG. 5 is a conceptual diagram illustrating an example of a coded video sequence.

FIG. 5 is a conceptual diagram illustrating an example of a coded video sequence 120 that corresponds to $GOP_2$ illustrated in FIG. 4. The HEVC HM defines a coded video sequence as a sequence of access units that consists, in decoding order, of an instantaneous decoding refresh (IDR) access unit followed by zero or more non-IDR access units including all subsequent access units up to but not including any subsequent IDR access unit. A coded picture is a coded representation of a picture containing all treeblocks of the picture. An access unit is a set of network abstraction layer (NAL) units that are consecutive in decoding order and represent one coded picture. An access unit may include video coding layer (VCL) NAL units representing coded slices of the coded picture, and non-VCL NAL units including delimiter data, parameter sets, and supplemental enhancement information (SEI) messages.

As illustrated in FIG. 5, coded video sequence 120 includes an access unit corresponding to each of $Pic_6$-$Pic_{10}$. The access units of video data stream 120 are arranged sequentially according to decoding order. It should be noted that the access unit corresponding to $Pic_9$ is located before the access unit corresponding to $Pic_8$. Thus, the decoding order does not correspond to the output order illustrated in FIG. 4. In this example, the difference between output order and decoding order is due to the fact that $Pic_8$ references $Pic_9$. Thus, $Pic_9$ must be decoded before $Pic_8$ can be decoded.

As illustrated in FIG. 5, the access unit corresponding to $Pic_9$ includes an access unit (AU) delimiter NAL unit 122, a picture parameter set (PPS) NAL unit 124, a $slice_1$ NAL unit 126, and a $slice_2$ NAL unit 128. $Slice_1$ NAL unit 126 and $slice_2$ NAL unit 128 each contain a slice of video data and are examples of VCL NAL units. As described above with respect to FIG. 4, $Pic_9$ represents a picture that includes I slices. In the example of FIG. 5, therefore, each of $slice_1$ NAL unit 126, and $slice_2$ NAL unit 128 of the access unit corresponding to $Pic_9$ may represent I-slices.

A non-VCL NAL unit includes information other than a slice of video data. For example, a non-VCL may contain delimiter data, a parameter set, or SEI messages. In the example illustrated in FIG. 5, AU delimiter NAL unit 122 includes information to delimit the access unit corresponding to $Pic_9$ from the access unit corresponding to $Pic_7$. In addition, PPS NAL unit 124 includes a picture parameter set. AU delimiter NAL unit 122 and PPS NAL unit 124 are examples of non-VCL NAL units. Another example of a non-VCL NAL unit is a SEI NAL unit. SEI NAL units may include picture timing SEI messages or buffering period SEI messages that are used by a video decoder when decoding a bitstream. Picture timing SEI messages may include information that indicates when a video decoder should begin to decode a VCL NAL unit. Buffering period SEI messages may include coded picture buffer (CPB) removal delay information that indicates when a video decoder should remove pictures from the CPB to avoid overflow.

In the HEVC HM, each of a video sequence, a GOP, a picture, a slice, a CU, a PU and a TU may be associated with syntax elements defined to indicate video coding properties for that video data structure. The HM further employs a parameter set concept. A parameter set is a syntax structure that includes syntax elements defined to indicate video coding properties applied to any video data structures that refer to the parameter set. The HM employs a hierarchical parameter set mechanism where syntax elements are included in a type of parameter set based on the frequency with which the video coding properties are expected to change. The parameter set mechanism, therefore, decouples the transmission of infrequently changing information from the transmission of coded block data. In some applications, the parameter sets may be conveyed "out-of-band," i.e., not transported together with coded video data, because out-of-band transmission is typically more reliable than in-band transmission.

The HM defines several different types of parameters sets, including one or more of a video parameter set (VPS), a sequence parameter set (SPS), a picture parameter set (PPS), and an adaptation parameter set (APS). A bitstream may include several different parameters sets of each type. A particular parameter set is identified using a parameter set identifier (ID). Each VPS includes a VPS ID, each SPS includes an SPS ID and may refer to a VPS ID, each PPS includes a PPS ID and refers to a SPS ID, and each slice header refers to a PPS ID, and possibly an APS ID. In addition, each buffering period supplemental enhancement information (SEI) message also refers a SPS ID, and possibly a VPS ID. In each of these examples, the parameter set IDs may be coded as syntax elements using a variable length unsigned integer exp-Golomb (ue(v)) coding method.

A VPS is a syntax structure that includes syntax elements that apply to zero or more entire coded video sequences. More specifically, a VPS includes syntax elements that describe overall characteristics of the coded video sequences, including profile, tier, and level information and dependencies between temporal sub-layers. A particular VPS is identified using a particular VPS ID encoded as a syntax element in a SPS or a SEI message. A SPS is a syntax structure that includes syntax elements that apply to zero or more entire coded video sequences. More specifically, a SPS includes syntax elements defined to indicate video coding properties that are expected to remain unchanged for a sequence of frames (e.g., picture order, number of reference frames, and picture size). A particular SPS is identified using a particular SPS ID encoded as a syntax element in a PPS or a SEI message.

A PPS is a syntax structure that includes syntax elements that apply to zero or more entire coded pictures. More specifically, a PPS includes syntax elements defined to indicate video coding properties that may change from picture-to-picture within a sequence (e.g., entropy coding mode, quantization parameters, and bit depth). A particular PPS is identified using a particular PPS ID encoded as a syntax element in a slice header. An APS is a syntax structure that includes syntax elements that apply to zero of more entire coded pictures. An APS, if coded, may include syntax elements defined to indicate video coding properties the change more frequently than other properties indicated in a PPS. A particular APS is identified using an APS ID encoded as a syntax element in a slice header.

Bitstream splicing refers to the concatenation or combination of two or more bitstreams or portions of bitstreams. For example, a first bitstream may be appended by a second bitstream, possibly with some modifications to either one or both of the bitstreams to generate a spliced bitstream. The first coded picture in the second bitstream is also referred to as the splicing point. Therefore, pictures after the splicing point in the spliced bitstream were originated from the second bitstream while pictures preceding the splicing point in the spliced bitstream were originated from the first bitstream. In some cases, a bitstream splicer may perform bitstream splicing. Bitstream splicers may be lightweight and less intelligent than video encoders. For example, a bitstream splicer may not be equipped with entropy decoding and entropy encoding capabilities. Bitstream splicing may be useful for scalability applications (e.g., for bit rate, frame rate, or spatial resolution scalability).

As described above, a bitstream may include one or more different parameters sets of each type, e.g., SPS and PPS. A parameter set of a particular type is identified using a parameter set identifier (ID). In some cases, a video decoder may receive a parameter set of a particular type with a particular parameter set ID that has different content than a previous parameter set (in bitstream or decoding order) of the same type with the same parameter set ID. In this case, the parameter set of the particular type with the particular parameter set ID (e.g., SPS 0) is updated. The parameter set update includes storing the content of the received parameter set with the particular parameter set ID to replace the previous parameter set of the same type and having the same parameter set ID value.

A parameter set update may occur when a new parameter set of a particular type is needed, but all possible values of the parameter set ID have been used. A parameter set update may also occur in spliced bitstreams even when parameter set ID value spaces are not fully utilized. Bitstreams often use only a few SPSs and a few PPSs, or even just one SPS and one PPS, and use the smallest SPS ID value and the smallest PPS ID value (i.e., 0). Therefore, when two bitstreams or portions of bitstreams are spliced, it is likely that the same SPS ID or PPS ID is referred to by the splicing point, originally from the second bitstream, and by the picture immediately preceding the splicing point picture, originally from the first bitstream. In this case, the content of the SPS or PPS referred to by the splicing point picture and the content of the SPS or PPS referred picture immediately preceding the splicing point picture is likely different.

In the particular case of SPS parameter sets, when the same SPS ID is referred to by the splicing point picture and by the picture immediately preceding the splicing point, and actually two different SPSs are used, then, in the spliced bitstream, the SPS with the particular SPS ID referred to by the picture immediately preceding the splicing point is effectively updated by the SPS referred to by the splicing point picture. In this case, SPSs of the spliced bitstream cannot be put in the beginning of the spliced bitstream. Although described above with respect to SPSs, the same is true for VPSs, PPSs, and APSs. Bitstream splicing and associated parameter set update has been described based on the assumption that there is only one splicing point in a spliced bitstream. A bitstream, however, may include multiple splicing points, and the techniques described herein may be applied to each of the splicing points individually.

Random access refers to decoding of a video bitstream starting from a coded picture that is not the first coded picture in the bitstream. Random access to a bitstream is useful in many video applications, such as broadcasting and streaming. For example, random access is useful for users to switch between different channels, to jump to specific parts of the video, or to switch to a different bitstream for stream adaptation (e.g., for bit rate, frame rate, or spatial resolution scalability). Random access is enabled by inserting Random Access Point (RAP) pictures or access units many times in regular intervals into a video bitstream.

An Instantaneous Decoding Refresh (IDR) picture can be used for random access to a bitstream. An IDR picture starts a coded video sequence and includes only intra-predicted slices (i.e., I-slices). Further, an IDR picture always cleans the decoded picture buffer (DPB). Thus, pictures following the IDR in decoding order cannot use pictures decoded prior to the IDR picture as reference. Consequently, bitstreams relying on IDR pictures for random access can have significantly lower coding efficiency.

To improve coding efficiency, the concept of Clean Random Access (CRA) pictures was introduced in the HEVC HM. A CRA picture, like an IDR picture, includes only intra-predicted slices, i.e., I-slices. CRA pictures are different from IDR pictures in that CRA pictures do not clean the DPB and may be located at any position within a coded video sequence. Therefore, pictures that follow a CRA picture in decoding order, but precede the CRA pictures in output order are allowed to use pictures decoded before the CRA picture as reference. Pictures that follow a CRA picture in decoding order but precede the CRA picture in output order are referred to as leading pictures associated with the CRA picture (or leading pictures of the CRA picture).

The leading pictures of a CRA picture are correctly decodable if the decoding starts from an IDR or CRA picture before the current CRA picture. The leading pictures of a CRA picture may be not be correctly decodable, however, when random access starts from the current CRA picture. Hence, the leading pictures are typically discarded during random access decoding from the current CRA picture. Referring to the example illustrated in FIGS. 4 and 5, $pic_9$ may be a CRA picture and $pic_8$ may be a leading picture of $pic_9$. $Pic_8$ is correctly decodable if $GOP_2$ is accessed at $pic_6$, but may not be correctly decodable if $GOP_2$ is accessed at $Pic_9$. This is due the fact that $pic_7$ may not be available if $GOP_2$ is accessed as $Pic_9$. To prevent error propagation from reference pictures that may not be available depending on where the decoding starts, all pictures that follow a CRA picture both in decoding order and output order may be constrained to not use any picture that precedes the CRA picture either in decoding order or output order (which includes the leading pictures) as reference.

In the HEVC HM, a bitstream starting with a CRA picture is considered as a conforming bitstream. When a bitstream starts with a CRA picture, the leading pictures of the CRA picture may refer to unavailable reference pictures and hence may not be able to be correctly decoded. The HM specifies, however, that the leading pictures of the starting CRA picture are not output, hence the name "clean random access." In the example illustrated in FIGS. 4 and 5, if a bitstream starts at $Pic_9$, $Pic_8$ is not output. For establishment of a bitstream conformance requirement, the HM specifies a decoding process to generate unavailable reference pictures for decoding of the non-output leading pictures. Conforming decoder implementations do not have to follow that decoding process, however, as long as the conforming decoder can generate identical output compared to when the decoding process is performed from the beginning of the coded video sequence.

It should be noted that similar random access functionalities to those in the HEVC HM are supported in H.264/AVC with the recovery point SEI message. An H.264/AVC decoder implementation may or may not support the random access functionality. It should further be noted that, in the HEVC HM, a conforming bitstream may contain no IDR pictures at all. The HM defines a coded video sequence as a sequence of access units that consists, in decoding order, of an IDR access unit followed by zero or more non-IDR access units including all subsequent access units up to but not including any subsequent IDR access unit. A conforming bitstream that contains no IDR pictures, therefore, may contain a subset of a coded video sequence or an incomplete coded video sequence.

Issues and proposed techniques related to parameter set updates in a bitstream will now be described. Conventionally, in order to determine whether to perform a parameter set update, a decoder compares parameter set content each time a new parameter set of a particular type with a particular parameter set ID is received that has the same parameter set ID as an earlier received parameter set of the same type. The parameter set comparison is performed to verify whether the parameter sets include the same or different content. Based on whether the parameter sets have the same content, a decoder determines whether to activate the currently received parameter set and deactivate the previously active parameter set. In the case where parameter sets are transmitted in-band with coded video data, the parameter sets may be repeatedly transmitted for improved error resilience. In this case, a decoder may make a comparison of the parameter set content for each repeated parameter set. Making comparisons of repeated parameters sets may impose an unnecessary burden on the decoder.

This disclosure describes techniques that may provide more efficient use of decoding processing resources particularly in the case of parameter set updates. In one example, this disclosure describes a video processing device configured to use a bitstream level indicator to determine whether a parameter set can be updated in a portion of a bitstream. In some cases, a bitstream-level indication may be used to indicate whether a parameter set can be updated. The indication may be a flag included in the bitstream, e.g., in the SPS, and the flag may be identical in all SPSs. When the flag is equal to 1, a parameter set may be updated. When the flag is equal to 0, no parameter set can be updated. In this case, a video decoder does not need to compare the contents of two parameter sets of the same type and with the same parameter set ID values to determine whether the parameter sets have the same content, because, when the flag is equal to 0, no parameter set update can occur and the video decoder operates as if the two parameter sets have the same content.

In other cases, a bitstream-level indication may be used to indicate whether a parameter set of a particular type (e.g., a VPS, SPS, PPS, or APS) can be updated. The indication may be a flag included in the bitstream, e.g., in the SPS, and the flag may be identical in all SPSs. When the flag is equal to 1, a parameter set of the particular type may be updated. When the flag is equal to 0, no parameter set of the particular type can be updated. In this case, a video decoder does not need to compare the contents of two parameter sets of the particular type and with the same parameter set ID values to determine whether the parameter sets have the same content, because, when the flag is equal to 0, no parameter set update can occur and the video decoder operates as if the two parameter sets have the same content. When there are three types of parameter sets, e.g., SPS, PPS and APS, three such indications are used, one for each type of parameter set.

In the examples described above, the indication is included at the bitstream level in a parameter set. In another example, the indication may be included in a SEI message. In yet another example, the indication may be included as a requirement in a definition of a profile. In some examples, the indication may be included at the coded video sequence level instead of at the bitstream level. In other examples, the indication may not be included in the bitstream, but instead the indication may be defined as a media type parameter and included in the session description protocol (SDP) when the video bitstream is used in a real-time transport protocol (RTP) based transmission environment, e.g., streaming or multicast using RTP for media data transport, during the session negotiation or capability exchange phase. As an additional example, in an HTTP streaming environment, e.g., dynamic adaptive streaming over HTTP (DASH), the indication may be defined as a stream property included in the media presentation description (MPD).

Issues and proposed techniques related to activating new parameter sets at IDR pictures will now be described. As described above, in many cases bitstream splicing point pictures are IDR pictures. The splicing point pictures typically have different video characteristics than pictures immediately preceding the splicing point in a spliced bitstream. A different parameter set of each type is, therefore, usually needed at the splicing point, and it would be a waste of decoding processing resources to compare whether the content of parameter sets associated with the splicing point picture are identical to the parameter sets associated with a previous picture. In this case, it may be more efficient to activate a new parameter set of each type associated with the splicing point picture without comparing the parameter set content. Further, when an IDR picture is a splicing point picture, in order to avoid a DPB overflow, it may be necessary to not output any pictures before the IDR picture even if the pictures have not yet been output when decoding the IDR picture.

This disclosure describes techniques that may provide more efficient use of decoding processing resources particularly in the case of parameter set updates at bitstream splicing points. In one example, this disclosure describes a video processing device configured to automatically activate a new parameter set of each type associated with a splicing point picture of a spliced bitstream. In particular, in many cases, bitstream splicing point pictures are IDR pictures. According to the techniques, at each IDR picture, a video decoder may activate each type of parameter set (and hence deactivate the previously active parameter set) even though the newly activated parameter set may be exactly the same as the previously active parameter set, including parameter set ID value and content. One potential shortcoming of activating new parameter sets at each IDR picture is that some unnecessary parameter set activation may be performed.

In another example, an indication may be included in the bitstream for each IDR picture to indicate whether the IDR picture is a splicing IDR (SIDR) picture. In this example, when an SIDR picture is indicated, a video decoder may activate each type of parameter set (hence deactivate the previously activate parameter set) even though the newly activated parameter set may be exactly the same as the previously active parameter set, including parameter set ID value and content. By only activating new parameter sets at SIDR pictures, instead of at each IDR picture, the unnecessary parameter set activation may be reduced. In addition, when an SIDR picture is indicated, the picture output behavior may be the same as if no_output_of_prior_pics_flag was present and equal to 1, indicating that no pictures prior to the SIDR picture will be output. The no_output_of_prior_pics_flag may or may not be present, e.g., in the slice header. In some cases, the indication may be a special distinct NAL unit type. In other cases, the indication may be a picture-level flag in the slice header, the PPS or the APS.

Issues and proposed techniques related to full random access to a bitstream from a RAP access unit will now be described. When parameter sets are transported in-band with coded video data, i.e., in the coded video bitstream, random access to the bitstream from an access unit for an IDR picture or a CRA picture may require fetching parameter sets from access units earlier than the IDR or CRA access unit in decoding order. When there is no need to fetch parameter sets from access units earlier than the IDR or CRA access unit in decoding order, it would be advantageous to notify a video decoder in order to avoid unnecessary fetching operations.

This disclosure describes techniques that may be used in order to provide more efficient use of decoding processing resources particularly in the case of random access. In one example, this disclosure describe a video processing device configured to use an indication in a bitstream to determine whether a parameter set NAL unit in an access unit preceding an IDR or a CRA access unit is needed to decode the IDR or CRA access unit. In particular, a bitstream may include an indication for each IDR or CRA access unit, to indicate whether a parameter set NAL unit preceding the IDR or CRA access unit (in bitstream or decoding order) is needed to decode the IDR or CRA access unit and any the subsequent access units (in bitstream or decoding order).

If the indication is true for one IDR or CRA access unit, then the video decoder may randomly access the bitstream from the IDR or CRA access unit without relying on any parameter set NAL unit preceding the IDR or CRA access unit. In this case, all earlier NAL units may be simply skipped or ignored. In one example, the indication for an IDR picture or a CRA picture may be signaled using a particular type of SPS (e.g., with a distinct NAL unit type) where the SPS may be the first NAL unit of the access unit or the first NAL unit after the access unit delimiter NAL unit, if present in the access unit. In another example, the indication may be signaled using a particular type of access unit delimiter, either with a distinct access unit delimiter NAL unit type or with a flag inside the NAL unit payload of an access unit delimiter NAL unit. In yet another example, the indication may be signaled using a flag in the NAL unit header in the access unit. As an additional example, the indication may be signaled using a particular type of SEI message in the access unit or a flag in an SEI message in the access unit.

Issues and proposed techniques related to leading pictures of CRA pictures in a bitstream will now be described. When the bitstream starts from a CRA picture, and the leading pictures associated with the CRA picture are not present at a video decoder, the coded picture buffer (CPB) may overflow. Consequently, a different set of hypothetical reference decoder (HRD) parameters may need to be applied in order to avoid buffer overflows. S. Deshpande, et al., "Signaling of CRA Pictures," 9th Meeting, Geneva, CH, 27 Apr.-7 May 2012, Doc., JCTVC-I0278 (hereinafter "Deshpande"), describes an indication (e.g., a new NAL unit type or a flag in a slice header) for a CRA picture to indicate whether the associated leading pictures are present, such that the video decoder can determine which set of HRD parameters to apply. The indication described by Deshpande, however, requires an external network entity (e.g., a streaming server or a Media Aware Network Element (MANE)) to make changes to NAL unit headers or slice headers of the CRA picture, which may be burdensome or impossible for the external network entity.

This disclosure describes techniques that may be used in order to avoid potential buffer overflows. In one example, this disclosure describes a video processing device configured to use an indication to determine whether leading pictures associated with a CRA picture that starts a bitstream are present. In particular, in one example, when the leading pictures of a CRA picture that starts a bitstream are not present, an external network entity may change the NAL unit type to indicate the CRA picture as an IDR picture. In another example, the external network entity may notify the video decoder of the presence or absence of leading pictures associated with a CRA picture that starts the bitstream.

The external network entity may generate a real-time streaming protocol (RTSP) message for RTSP-based streaming systems, or a session description protocol (SDP) parameter sent during session negotiations for both RTSP-based streaming and session announcement protocol (SAP)-based broadcasting/multicasting as a static configuration. In HTTP streaming, e.g., dynamic adaptive streaming over HTTP (DASH), the indication may be realized by allocating different uniform resource locators (URLs) or allocating a URL with different byte offsets for the CRA picture and the leading pictures. In this case, the video decoder may determine by itself whether the leading pictures of the CRA picture are present as it is the video decoder that determines whether to request the leading pictures.

Issues and proposed techniques related to temporal motion vector prediction will now be described. Referring again to FIG. 4, each of $Pic_6$, $Pic_7$, and $Pic_9$ are used as reference pictures. As described above, motion information syntax elements may identify the location of a predictive video block in a reference picture for inter-prediction of a video block in a current picture. Motion prediction may refer to the process of defining motion information (e.g., motion vectors and reference picture indexes) for a given video block relative to motion information for a previously coded video block. For example, motion prediction may involve using motion information of a previously coded CU to generate motion information for a current CU being coded.

Motion prediction may be applied to reduce the amount of data needed to communicate the motion vector of the current CU.

One example of motion prediction is merge mode motion prediction. In merge mode motion prediction, motion information for a current CU is inherited from a previously coded neighboring video block. Motion prediction techniques may use an index value to identify a neighboring video block from which the current video block derives its motion information. Possible neighboring video blocks may include, for example, video blocks in the current picture that are adjacent to the current CU (e.g., above, below, to the left, or to the right). Further, possible neighboring video blocks may also include video blocks that are located in pictures other than the current picture (e.g., a video block co-located from a temporally adjacent picture). When a possible neighboring video block is located in a picture other than the current picture, it is referred to as temporal motion vector prediction (TMVP). For example, in the example illustrated in FIG. 4, if $Pic_8$ inherits a motion vector from $Pic_7$, this is a TMVP. In some instances, it may be advantageous to allow for some pictures, slices, and CUs to use TMVP while not allowing others to use TMVP.

The HEVC HM allows TMVP to be enabled or disabled on a picture-by-picture basis, and may signal the enablement of TMPV using the flag enable_temporal_mvp_flag in the PPS. As described above, each slice header references a particular PPS using a particular PPS ID, and determines whether TMVP is enabled for the picture based on the flag value in the particular PPS. For example, when a slice refers to a PPS with an enable_temporal_mvp_flag value equal to 0 and has a temporal_id equal to 0, a marking process of reference pictures in the DPB is invoked. That is, all pictures in the decoded picture buffer (DPB) are marked as "unused for temporal motion vector prediction" and TMVP from earlier reference pictures is disallowed.

As an alternative to including enable_temporal_mvp_flag in the PPS, it has been described, in Lim, Chong Soon et al. "High-level Syntax: Proposed fix on signaling of TMVP disabling flag" 9th Meeting, Geneva, CH, 27 Apr.-7 May 2012, Doc., JCTVC-I0420, (hereinafter "Lim"), to explicitly signal the enable_temporal_mvp_flag at every P and B slice header. While the technique described in Lim removes the need for a marking process, and determines the TMVP pictures independently instead of relying on picture-by-picture update, the technique described in Lim is not efficient when many pictures or all pictures in a coded video sequence do not use TMVP. Under the technique described in Lim, the slice headers of all P and B slices within a picture or sequence would include the enable_temporal_mvp_flag even if none of the slices use TMVP.

This disclosure describes techniques that may be used in order to reduce signaling of the enable_temporal_mvp_flag for every P and B slice header. In one example, this disclosure describes a video processing device configured to identify a flag in the SPS to determine whether temporal motion vector prediction is enabled. In particular, in some examples, a flag (e.g., enable_temporal_mvp_ps_flag) may be added into the SPS or PPS. When this flag is equal to 0 in a particular SPS or PPS, the enable_temporal_mvp_flag is not present in any slice header that refers to the particular SPS or PPS. When this flag is equal to 1 in a particular SPS or PPS, the enable_temporal_mvp_flag is present in each slice header that refers to the particular SPS or PPS. The semantics of enable_temporal_mvp_flag in the slice headers may be the same as in the Lim proposal.

Issues and proposed techniques related to reference picture set signaling for coded pictures in a bitstream will now be described. As described above, in addition to motion vectors, motion information syntax elements may also include reference picture indexes. The HEVC HM uses a Reference Picture Set (RPS) based mechanism to manage reference pictures. An RPS refers to a set of reference pictures associated with a picture, consisting of all reference pictures that are prior to the associated picture in decoding order, that may be used for inter-prediction of the associated picture or any picture following the associated picture in decoding order. In the HM, an RPS for each coded picture is directly signaled. Syntax elements for signaling the RPS are included in both the SPS and the slice header. For a particular coded picture, the RPS may be one of the possible picture sets included in the SPS, as indicated by a flag in the slice header, or directly signaled in the slice header.

The RPS for each picture comprises five different lists of reference pictures, also referred to the five RPS subsets. The five RPS subsets include: RefPicSetStCurrBefore, RefPicSetStCurrAfter, RefPicSetStFoll, RefPicSetLtCurr, and RefPicSetLtFoll. RefPicSetStCurrBefore includes all short-term reference pictures (STRPs) that are prior to the current picture in both decoding order and output order, and that may be used in inter prediction of the current picture. RefPicSetStCurrAfter consists of all short-term reference pictures that are prior to the current picture in decoding order, that succeed the current picture in output order, and that may be used in inter prediction of the current picture. RefPicSetStFoll consists of all short-term reference pictures that may be used in inter prediction of one or more of the pictures following the current picture in decoding order, and that are not used in inter prediction of the current picture. RefPicSetLtCurr consists of all long-term reference pictures (LTRPs) that may be used in inter prediction of the current picture. RefPicSetLtFoll consists of all long-term reference pictures that may be used in inter prediction of one or more of the pictures following the current picture in decoding order, and that are not used in inter prediction of the current picture.

It has been described, in K. Suehring et al. "Long-term Picture Signaling for error-free environments" 9th Meeting, Geneva, CH, 27 Apr.-7 May 2012, Doc., JCTVC-I0112 (hereinafter "Suehring"), to identify a LTRP by an index to the picture order count (POC) ordered list of reference pictures in the decoded picture buffer (DPB) that are: 1) marked as "used for reference," and 2) not included in the short-term reference picture sets. Suehring states that in an error-free environment, such signaling of LTRPs is efficient. In an error-free environment, however, the STRPs can also be identified by indices to the POC ordered list of reference pictures in the DPB.

This disclosure describes techniques that may be used for identifying the STRPs. In one example, this disclosure describes a video processing device configured to identify a STRP by an index to the POC ordered list of reference pictures in the DPB. In particular, in some examples, each STRP may be identified by an index to the POC ordered list of reference pictures in the DPB. In some cases, the order may be in increasing order of POC values. In other cases, the order may be in decreasing order of POC values. For the first indicated STRP, the index is directly coded, e.g., using one of unsigned integer exp-Golomb (ue(v)) coding, the truncated integer exp-Golomb (te(v)) coding, or unsigned integer (u(v)) coding. If u(v) coding, then the length, in bits, of the index is Ceil(log 2(N)), where N is the number of reference pictures in the DPB. For other indicated STRP, the difference between the index of the current STRP and the index of the previous STRP is signaled. Alternatively, the reference pictures in the DPB may be split into two lists. In this example, one of the lists includes reference picture with POC less than the POC of the current picture and may be ordered in decreasing order of POC values. The other one of the lists includes reference pictures with POC value greater than the POC value of the current picture and may be ordered in increasing order of POC values. Then, each STRP to be included in the short-term reference picture set may be identified by the list (i.e., one of the two lists) and the index to that list.

Issues and proposed techniques related to category-prefixed data batching for the picture partitioning schemes of tiles and wavefront parallel processing (WPP) will now be described. As described above, the HEVC HM includes four different picture partitioning schemes, namely regular slices, entropy slices, tiles, and WPP. Regular slices are similar to those in H.264/AVC. Each regular slice is encapsulated in its own NAL unit, and in-picture prediction (e.g., intra sample prediction, motion information prediction, coding mode prediction) and entropy coding dependency across slice boundaries are disabled. Thus, a regular slice can be reconstructed independently from other regular slices within the same picture (though there may still be interdependencies due to loop filtering operations). Since the basic unit in HEVC, i.e., a treeblock, can be of a relatively big size (e.g., a treeblock may be 64×64), a concept of "fine granularity slices" is included in the HM to allow for MTU size matching through slice boundaries within a treeblock, as a special form of regular slices. The slice granularity is signaled in picture parameter set, whereas the address of a fine granularity slice is still signaled in the slice header.

Entropy slices, like regular slices, break entropy decoding dependencies but allow in-picture prediction (and filtering) to cross entropy slice boundaries. Entropy slices, therefore, can be used as a lightweight mechanism to parallelize the entropy decoding without having an impact on other decoding steps. Though each entropy slice is encapsulated into its own NAL unit, it has a much shorter slice header compared to a regular slice, as most of the slice header syntax elements are not present and must be inherited from the preceding full slice header. Due to the allowance of in-picture prediction between neighboring entropy slices within a picture, the required inter-processor/inter-core communication to enable in-picture prediction can be substantial. Entropy slices are not recommended to be used for MTU size matching in error-prone environments, because due to in-picture prediction a loss of one entropy slice also causes failure of the decoding of the next entropy slice in decoding order. Entropy slices appear to have limited use to system architectures that execute the entropy decoding process on a multicore or multi-CPU architecture, but execute the remaining decoding functionality on dedicated signal processing hardware.

In WPP, the picture is partitioned into rows of treeblocks. Entropy decoding and prediction are allowed to use data from treeblocks in other partitions. Parallel processing is possible through parallel decoding of rows of treeblocks, where the start of the decoding of a row is delayed by two treeblocks, so to ensure that data related to a treeblock above and to the right of the subject treeblock is available before the subject treeblock is being decoded. Using this staggered start (which appears like a wavefront when represented graphically), parallelization is possible with up to as many processors/cores as the picture contains treeblock rows. The HEVC HM includes a mechanism to organize the coded bits of different treeblock rows to be beneficial to a particular number of parallel processors/cores. For example, it is possible that coded bits of even numbers of treeblock rows (treeblock rows 0, 2, 4, . . . ) all come before coded bits of odd numbers of treeblock rows (treeblock rows 1, 3, 5, . . . ), such that the bitstream is decodable by two parallel processors/cores, though decoding of an earlier-coming treeblock row (e.g. treeblock row 2) refers to a later-coming treeblock row (e.g. treeblock row 1). Similar to the entropy slices, due to the allowance of in-picture prediction between neighboring treeblock rows within a picture, the required inter-processor/inter-core communication to enable in-picture prediction can be substantial. The WPP partitioning does not result in more NAL units compared to when it is not applied; thus, WPP cannot be used for MTU size matching.

Tiles define horizontal and vertical boundaries that partition a picture into tile columns and rows. The scan order of treeblocks is changed to be local within a tile (in the order of a treeblock raster scan of a tile), before decoding the top-left treeblock of the next tile in the order of tile raster scan of a picture. Similar to regular slices, tiles break in-picture prediction dependencies as well as entropy decoding dependencies. Tiles, however, do not need to be included into individual NAL units (same as WPP in this regard) and, hence, cannot be used for MTU size matching. Each tile can be processed by one processor/core, and the inter-processor/inter-core communication required for in-picture prediction between processing units decoding neighboring tiles is limited to conveying the shared slice header, in cases where a slice is spanning more than one tile, and loop filtering related sharing of reconstructed samples and metadata. Tiles, therefore, are less demanding in terms of memory bandwidth compared to WPP due to the in-picture independence between two neighboring partitions.

In the HEVC HM, the regular slice is the only tool that can be used for parallelization that is also available, in virtually identical form, in H.264/AVC. Regular slices based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). For the same reason, however, regular slices may require some coding overhead. Further, regular slices (in contrast to some of the other partitioning schemes mentioned above) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching can place contradicting demands to the slice layout in a picture.

For simplicity, restrictions of the four different picture partitioning schemes are specified in the HM. For example, in the HM, no combination of any two of entropy slices, tiles, and WPP may be applied at the same time. Furthermore, in the HM, for each slice and tile, either or both of the following conditions must be fulfilled: 1) all coded treeblocks in a slice belong to the same tile, and 2) all coded treeblocks in a tile belong to the same slice.

An interleaved data order for tile and WPP, which also makes both entry point signaling methods less useful, has been described in S. Kanumuri, et al. "Category-prefixed data batching for tiles and wavefronts" 9th Meeting, Geneva, CH, 27 Apr.-7 May 2012, Doc., JCTVC-I0427 (hereinafter "Kanumuri"). One problem associated with the proposed approach in Kanumuri is that the maximum number of categories supported is 32. It is possible, however, that there may be more than 32 WPP sub-streams (e.g., when each treeblock row is a sub-stream and there are more than 32 treeblock rows) or more than 32 tiles, and it is required that each WPP sub-stream or tile entry point is known, e.g., for processing treeblocks (both parsing and decoding) in treeblock raster scan of a picture by a single-core decoder. Furthermore, the proposed approach in Kanumuri imposes a burden on single-core decoding, as the merging process to merge interleaved data or jumping back and forth in the bitstream of a NAL unit is needed, depending on the processing order.

This disclosure describes techniques that may be used to indicate whether category prefixed data batching is applied. In one example, this disclosure describes a video processing device configured to identify with an indicator whether category-prefixed data batching is applied. In particular, in some examples, an indication may be added in the SPS or PPS to indicate whether category-prefixed data batching is applied. If it is indicated that category-prefixed data batching is not applied, then the conventional way of handling tiles may be applied. In other examples, the maximum number of categories can vary, and the value of the maximum number of categories may be signaled in the SPS or PPS. In further examples, the mapping of tiles or WPP sub-streams to categories (i.e., which tiles or WPP sub-streams belong to each category) may be signaled, e.g., in the SPS or PPS.

Figure 6:
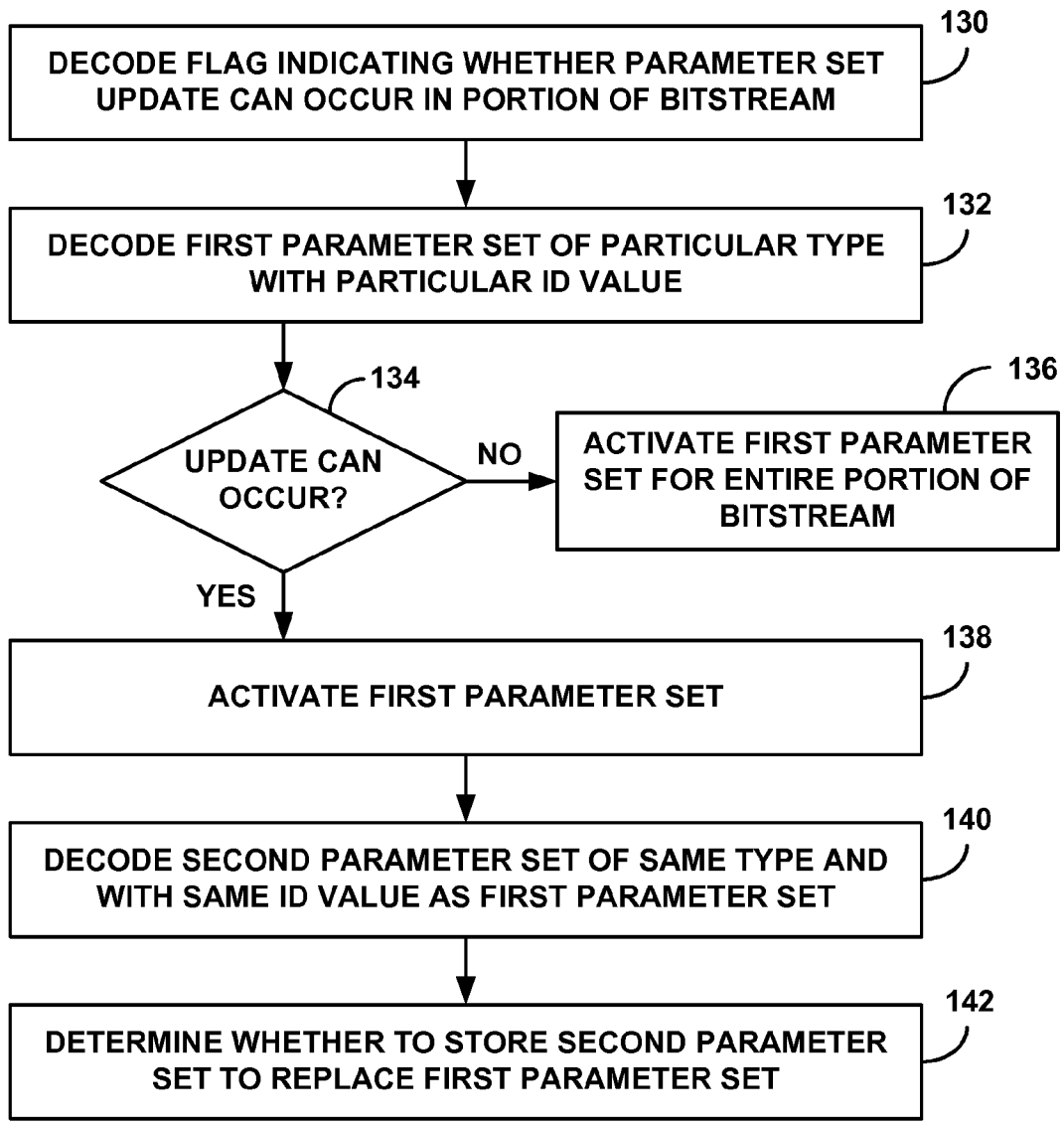
FIG. 6 is a flowchart illustrating an operation of determining whether a parameter set update can occur in a portion of a bitstream.

FIG. 6 is a flowchart illustrating an operation of determining whether a parameter set update can occur in a portion of a bitstream. The illustrated operation is described as being performed by video decoder 30 from FIG. 3 based on an indication generated by video encoder 20 from FIG. 2.

Video decoder 30 may receive a bitstream from video encoder 20 with one or more coded video sequences including multiple access units representing coded video slices and coded parameter sets. Video decoder 30 decodes a flag defined to indicate whether a parameter set update can occur in a portion of the bitstream, such as one of the coded video sequences (130). In one example, the flag may be included in a SEI NAL unit included in at least one access unit of the coded video sequence. In another example, the flag may be included in a SPS NAL unit included in at least one access unit of the coded video sequence.

In some cases, the flag may indicate whether parameter sets of any type can be updated in the coded video sequence, such that only one flag may be used for all types of parameter sets. In other cases, the flag may indicate whether a parameter set of a particular type can be updated in the coded video sequence, such that a different flag may be used for each type of parameter set. In still other cases, the flag may indicate whether parameter sets of two or more types can be updated in the coded video sequence, such that one flag may be used to indicate update status for the two or more types of parameter sets and another flag may be used to indicate update status for additional types of parameter sets.

Video decoder 30 then decodes a first parameter set of a particular type with a particular ID value from a parameter set NAL unit included in one of the access units of the coded video sequence (132). When the flag indicates that no parameter set update can occur in the coded video sequence for the particular type of parameter set (NO branch of 134), video decoder 30 activates the first parameter set for the entire portion of the bitstream, i.e., the coded video sequence in this example (136). In this case, upon decoding a subsequent parameter set of the same type and having a same identification value as the first parameter set, video decoder 30 does not need to determine whether to update the first parameter set for the coded video sequence and can ignore the subsequent parameter set. Video decoder 30 may, therefore, operate as if the content of the first parameter set is identical to content included in any other parameter set of the same type having the same ID value.

When the flag indicates that a parameter set update can occur in the coded video sequence for the particular type of parameter set (YES branch of 134), video decoder 30 activates the first parameter set (138). Video decoder 30 then decodes a second parameter set of the same type and with the same ID value as the first parameter set from a parameter set NAL unit included in one of the access units of the coded video sequence (140). In this case, because parameter set updates can occur, video decoder 30 determines whether to store the second parameter set to replace the first parameter set (142).

In some cases, video decoder 30 may automatically activate the second parameter set for the coded video sequence, and deactivate the first parameter set. In other cases, video decoder 30 may compare content of the first parameter set to content of the second parameter set. When the content of the second parameter set is different than the content of the first parameter set, video decoder 30 activates the second parameter set for the coded video sequence, and deactivates the first parameter set.

Figure 7:
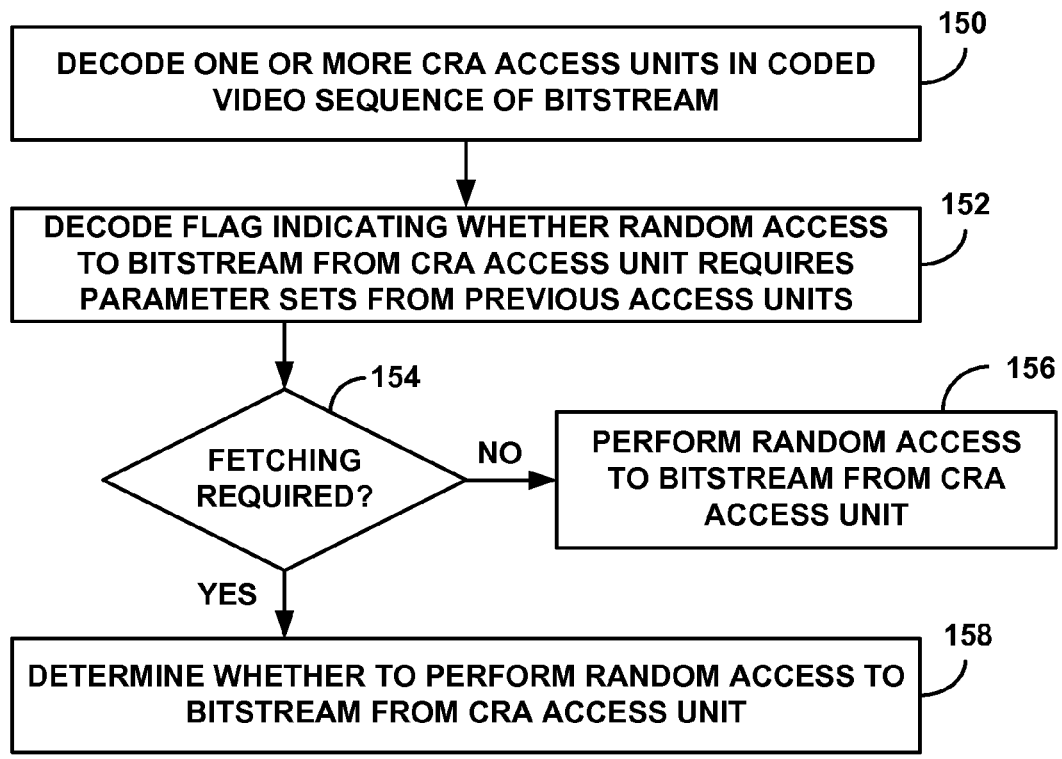
FIG. 7 is a flowchart illustrating an operation of determining whether random access from a CRA access unit can be performed without having to fetch parameter sets from previous unavailable access units.

FIG. 7 is a flowchart illustrating an operation of determining whether random access from a CRA access unit can be performed without having to fetch parameter sets from previous unavailable access units. The illustrated operation is described as being performed by video decoder 30 from FIG. 3 based on an indication generated by video encoder 20 from FIG. 2.

The HEVC HM introduced CRA pictures to provide more options for random access to the bitstream without lower coding efficiency, as occurs with IDR pictures. CRA access units can be positioned at any point within a coded video sequence and do not clean the decoded picture buffer (DPB), which allows leading pictures of a given CRA access unit (i.e., pictures that follow the CRA access unit in decoding order but precede the CRA access unit in output order) to use pictures decoded before the CRA access unit as reference pictures. The leading pictures may only be correctly decoded, however, when random access starts from a RAP picture decoded before the given CRA access unit. In the case wherein random access starts from the particular CRA picture, all pictures preceding the CRA picture in output or decoding order will not be decoded and are unavailable for use as reference pictures. In order to decode the CRA picture or any subsequent access units in output or decoding order, video decoder 30 may need to fetch one or more parameter sets included in an access unit for one of the unavailable previous pictures, which is a burdensome operation.

Video decoder 30 may receive a bitstream from video encoder 20 with one or more coded video sequences including multiple access units representing coded video slices and coded parameter sets. Video decoder 30 decodes one or more CRA access units from a coded video sequence of the bitstream (150). Video decoder 30 also decodes a flag defined to indicate whether random access to the bitstream from a particular CRA access unit requires parameter sets from previous, unavailable access units (152). In one example, the flag may be included in a SEI NAL unit included in the particular CRA access unit in the coded video sequence of the bitstream.

When the flag indicates that no parameter sets from previous access units need to be fetched (i.e., fetching is not required) for random access from the particular CRA access unit (NO branch of 154), video decoder 30 performs random access to the bitstream from the particular CRA access unit without performing a fetching operation (156). Conversely, when the flag indicates that parameter sets from previous access units need to be fetched (i.e., fetching is required) for random access from the particular CRA picture (YES branch of 154), video decoder 30 determines whether to perform random access to the bitstream from the particular CRA access unit in order (158). In some cases, video decoder 30 may determine that random access to the bitstream is available from another RAP picture without performing a fetching operation, and further determine to not perform random access to the bitstream from the particular CRA access unit in order to avoid fetching the parameter sets from the previous access units. In other cases, video decoder 30 may determine that random access to the bitstream is from another RAP picture is not available, and further determine to perform random access to the bitstream from the particular CRA access unit after fetching the parameter sets from the previous access units.

In this way, based on the flag, video decoder 30 first determines whether a fetching operation is required for random access decoding from the particular CRA access unit, and may avoid performing a fetching operation by selecting a different RAP picture from which to perform random access. The indication is especially useful for CRA access units, because CRA access units can be positioned at any point within a coded video sequence and do not clean the DPB, which provides more options for random access to the bitstream without lower coding efficiency.

Figure 8:
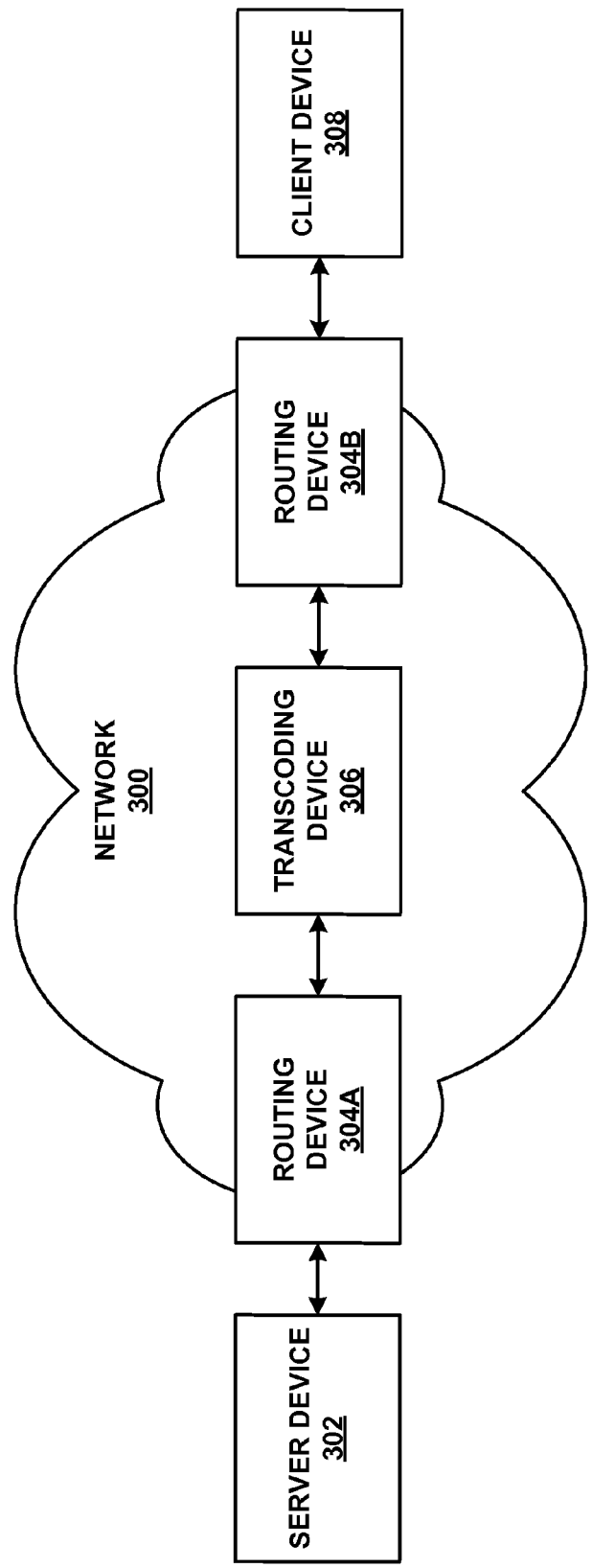
FIG. 8 is a block diagram illustrating an example set of devices that form part of a network.

FIG. 8 is a block diagram illustrating an example set of devices that form part of network 300. In this example, network 300 includes routing devices 304A, 304B (collectively referred to as "routing devices 304") and transcoding device 306. Routing devices 304 and transcoding device 306 are intended to represent a small number of devices that may form part of network 300. Other network devices, such as switches, hubs, gateways, firewalls, bridges, and other such devices may also be included within network 300. Moreover, additional network devices may be provided along a network path between server device 302 and client device 308. In some examples, server device 302 may correspond to source device 12 from FIG. 1, while client device 308 may correspond to destination device 14 from FIG. 1.

In general, routing devices 304 implement one or more routing protocols to exchange network data through network 300. In some examples, routing devices 304 may be configured to perform proxy or cache operations. Therefore, in some examples, routing devices 304 may be referred to as proxy devices as well. In general, routing devices 304 execute routing protocols to discover routes through network 300. By executing such routing protocols, routing device 304B may discover a network route from itself to server device 302 via routing device 304A.

The techniques of this disclosure may be implemented by network devices such routing devices 304 and transcoding device 306, but also may be implemented by client device 308. In this manner, routing devices 304, transcoding device 306, and client device 308 represent examples of devices configured to implement one or more of the techniques described in this disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or

What is claimed is:

1. A method of decoding video data comprising:
    decoding a single flag that indicates whether an update may or does not occur for all parameters of a plurality of parameter sets included within a coded video sequence (CVS) of video data; and
    based on the single flag indicating that the update may occur in the CVS:
        comparing first content of a current parameter set of a particular type and having a particular identification value to second content of a previous parameter set of the same particular type and having the same particular identification value, and
        performing a parameter set update based on the first content of the current parameter set being different than the second content of the previous parameter set; or
    based on the single flag indicating that the update does not occur in the CVS:
        refraining from comparing content of another parameter set of the same particular type and having the same particular identification value to the second content of the previous parameter set.

2. The method of claim 1, further comprising, based on the single flag indicating that the update does not occur in the CVS:
    utilizing the previous parameter set for the entire CVS.

3. The method of claim 1, wherein performing the parameter set update further comprises activating the current parameter set and deactivating the previous parameter set for the CVS.

4. The method of claim 1, further comprising, based on the single flag indicating that the update does not occur in the CVS, receiving one or more parameter sets in an out-of-band transmission separate from the CVS.

5. The method of claim 1, further comprising, based on the single flag indicating that the update does not occur in the CVS, receiving one or more parameter sets in an in-band transmission with the CVS without comparing content for any repeated transmissions of the first parameter set.

6. The method of claim 1, wherein the single flag is included in a supplemental enhancement information (SEI) message of at least one access unit for the CVS.

7. The method of claim 1, wherein the single flag is included in a sequence parameter set (SPS) network abstraction layer (NAL) unit included in at least one access unit of the CVS.

8. The method of claim 1, further comprising, based on the single flag indicating that the update does not occur in the CVS, receiving one or more parameter sets at a beginning of the CVS.

9. The method of claim 1, wherein a first value of the single flag indicates that the update may occur in the CVS, and wherein a second value of the flag indicates that the update does not occur in the CVS.

10. The method of claim 1, further comprising:
    based on the single flag indicating that the parameter set update does not occur, decoding the CVS of video data based on the previous parameter set.

11. A method of encoding video data comprising:
    encoding a single flag that indicates whether an update may occur or does not occur for all parameters of a plurality of parameter sets included within a coded video sequence (CVS) of video data;
    encoding a current parameter set of a particular type with a particular identification value;
    when the update may occur in the CVS and based on first content of the current parameter set being different than second content of a previous parameter set of the same particular type and having the same particular identification value, storing the current parameter set to replace the previous parameter set; and
    when the update does not occur in the CVS, refraining from storing the current parameter set to replace the previous parameter set.

12. The method of claim 11, further comprising, when the update does not occur in the CVS, encoding one or more parameter sets in an out-of-band transmission separate from the CVS.

13. The method of claim 11, further comprising, when the update does not occur in the CVS, encoding one or more parameter sets in an in-band transmission with the CVS.

14. The method of claim 11, wherein the single flag is included in a supplemental enhancement information (SEI) message of at least one access unit for the CVS.

15. The method of claim 11, wherein the single flag is included in a sequence parameter set (SPS) network abstraction layer (NAL) unit included in at least one access unit of the CVS.

16. The method of claim 11, further comprising, when that the update does not occur in the CVS, encoding one or more parameter sets at a beginning of the CVS.

17. The method of claim 11, wherein a first value of the single flag indicates that the update may occur in the CVS, and wherein a second value of the flag indicates that the update does not occur in the CVS.

18. The method of claim 11, further comprising:
    when the update does not occur, encoding the CVS of video data based on the previous parameter set.

19. A video decoding device for decoding video data, the device comprising:
    a memory configured to store video data; and
    one or more processors configured to:
        decode a single flag that indicates whether an update may occur or does not occur for all parameters of a plurality of parameter sets included within a coded video sequence (CVS) of video data,
        based on the single flag indicating that the update may occur in the CVS:
            compare first content of a current parameter set of a particular type and having a particular identification value to second content of a previous parameter set of the same particular type and having the same particular identification value, and
            perform a parameter set update based on the first content of the current parameter set being different than the second content of the previous parameter set; and
        based on the single flag indicating that the update does not occur in the CVS:
            refrain from comparing content of another parameter set of the same particular type and having the same particular identification value to the second content of the previous parameter set.

20. The device of claim 19, wherein, based on the single flag indicating that the update does not occur in the CVS, the one or more processors are configured to:
    utilize the previous parameter set for the entire CVS.

21. The device of claim 19, wherein, to perform the parameter set update, the one or more processors are configured to activate the current parameter set and deactivate the previous parameter set for the CVS.

22. The device of claim 19, wherein the single flag indicates whether the update may occur or does not occur in the CVS for any type of parameter set.

23. The device of claim 19, wherein, based on the single flag indicating that the update does not occur in the CVS, the one or more processors are configured to receive one or more parameter sets in an out-of-band transmission separate from the CVS.

24. The device of claim 19, wherein, based on the single flag indicating that the update does not occur in the CVS, the one or more processors are configured to receive one or more parameter sets in an in-band transmission with the CVS.

25. The device of claim 19, wherein the single flag is included in a supplemental enhancement information (SEI) message of at least one access unit for the CVS.

26. The device of claim 19, wherein the single flag is included in a sequence parameter set (SPS) network abstraction layer (NAL) unit included in at least one access unit of the CVS.

27. The device of claim 19, wherein, based on the single flag indicating that the update does not occur in the CVS, the one or more processors are configured to receive one or more parameter sets at a beginning of the CVS.

28. The device of claim 19, wherein a first value of the single flag indicates that the update may occur in the CVS, and wherein a second value of the flag indicates that the update does not occur in the CVS.

29. The device of claim 19, wherein, based on the single flag indicating that the update does not occur, the one or more processors are configured to decode the CVS of video data based on the previous parameter set.

30. A video decoding device for decoding video data, the device comprising:
- means for decoding a single flag that indicates whether an update may or does not occur for all parameters of a plurality of parameter sets included within a coded video sequence (CVS) of video data;
- means for comparing, based on the single flag indicating that the update may occur in the CVS, first content of a current parameter set of a particular type and having a particular identification value to second content of a previous parameter set of the same particular type and having the same particular identification value;
- means for performing a parameter set update based on the first content of the current parameter set being different than the second content of the previous parameter set; and
- means for refraining, based on the single flag indicating that the update does not occur in the CVS, from comparing content of another parameter set of the same particular type and having the same particular identification value to the second content of the previous parameter set.

31. The device of claim 30, wherein a first value of the single flag indicates that the update may occur in the CVS, and wherein a second value of the flag indicates that the update does not occur in the CVS.

32. The device of claim 30, further comprising:
- means for decoding, based on the single flag indicating that the update does not occur, the CVS of video data based on the previous parameter set.

33. A non-transitory computer-readable medium comprising instructions for decoding video data, the instructions, when executed, cause one or more processors to:
- decode a single flag indicative of whether a parameter set update may or does not occur for all parameters of a plurality of parameter sets included within a coded video sequence (CVS);
- based on the single flag indicating that the update may occur in the CVS, compare first content of a current parameter set of a particular type and having a particular identification value to second content of a previous parameter set of the same particular type and having the same particular identification value;
- perform a parameter set update based on the first content of the current parameter set being different than the second content of the previous parameter set;
- refrain, based on the single flag indicating that the update does not occur in the CVS, from comparing content of another parameter set of the same particular type and having the same particular identification value to the second content of the previous parameter set.

34. The non-transitory computer-readable medium of claim 33, wherein a first value of the single flag indicates that the update may occur in the CVS, and wherein a second value of the flag indicates that the update does not occur in the CVS.

35. The non-transitory computer-readable medium of claim 33, further comprising instructions that cause the one or more processors to:
- decode the CVS of video data based on the previous parameter set based on the single flag indicating that the update does not occur.

\* \* \* \* \*